(12) United States Patent
Ohtani

(10) Patent No.: US 7,709,175 B2
(45) Date of Patent: May 4, 2010

(54) METHOD FOR PRODUCING A TONER, AND TONER

(75) Inventor: Shinji Ohtani, Sunto-gun (JP)

(73) Assignee: Ricoh Company, Ltd., Tokyo (JP)

( * ) Notice: Subject to any disclaimer, the term of this patent is extended or adjusted under 35 U.S.C. 154(b) by 402 days.

(21) Appl. No.: 11/376,286

(22) Filed: Mar. 16, 2006

(65) Prior Publication Data

US 2006/0210909 A1   Sep. 21, 2006

(30) Foreign Application Priority Data

Mar. 17, 2005 (JP) .............................. 2005-076995
Feb. 22, 2006 (JP) .............................. 2006-045219

(51) Int. Cl.
*G03G 9/08* (2006.01)
(52) U.S. Cl. .................................................. 430/137.1
(58) Field of Classification Search ............... 430/137.1
See application file for complete search history.

(56) References Cited

U.S. PATENT DOCUMENTS

| 2002/0069971 | A1* | 6/2002 | Kaji et al. | 156/345.46 |
| 2003/0224271 | A1* | 12/2003 | Teshima | 430/105 |
| 2004/0048183 | A1* | 3/2004 | Teshima | 430/137.1 |
| 2004/0259013 | A1 | 12/2004 | Ohtani et al. | |
| 2005/0003288 | A1 | 1/2005 | Sugiyama et al. | |
| 2005/0154088 | A1* | 7/2005 | Miura et al. | 523/223 |
| 2005/0196691 | A1 | 9/2005 | Ohtani et al. | |
| 2006/0227179 | A1* | 10/2006 | Temple et al. | 347/68 |

FOREIGN PATENT DOCUMENTS

| EP | 1344562 | 9/2003 |
| EP | 1372042 | 12/2003 |
| JP | 7-152202 | 6/1995 |
| JP | 2003-262976 | 9/2003 |
| JP | 2003-262977 | 9/2003 |
| JP | 2003-280236 | 10/2003 |
| JP | 2004-70303 | 3/2004 |
| JP | 2004-157267 | 6/2004 |
| JP | 2005-24860 | 1/2005 |
| JP | 2005-24861 | 1/2005 |
| JP | 2005-24862 | 1/2005 |
| JP | 2005-24863 | 1/2005 |
| JP | 2005-77784 | 3/2005 |
| JP | 2005-148573 | 6/2005 |
| JP | 2005-148574 | 6/2005 |

(Continued)

OTHER PUBLICATIONS

Abstract of CN 1341488. Mar. 27, 2002.*

(Continued)

*Primary Examiner*—Hoa V Le
(74) *Attorney, Agent, or Firm*—Oblon, Spivak, McClelland, Maier & Neustadt, L.L.P.

(57) ABSTRACT

The object of the present invention is to provide a method for producing a toner which includes ejecting a toner composition fluid containing a toner composition which contains a toner and a colorant, from a nozzle vibrated at a constant frequency to make the toner composition fluid into droplets, and solidifying the droplets to be made into particles, in which the toner composition fluid comprises a toner composition, and the toner composition contains a resin, and a colorant.

16 Claims, 5 Drawing Sheets

FOREIGN PATENT DOCUMENTS

KR      10-0471750    *   3/2005
WO      2005/073815     8/2005

OTHER PUBLICATIONS

Abstract of KR 471750. Mar. 16, 2005.*
U.S. Appl. No. 12/036,706, filed Feb. 25, 2008, Suzuki, et al.
U.S. Appl. No. 12/047,437, filed Mar. 13, 2008, Kuramoto, et al.
U.S. Appl. No. 11/409,042, filed Apr. 24, 2006, Ohtani.
U.S. Appl. No. 11/851,475, filed Sep. 7, 2007, Watanabe, et al.

* cited by examiner

METHOD FOR PRODUCING A TONER, AND TONER

BACKGROUND OF THE INVENTION

1. Field of the Invention

The present invention relates to a method for producing a toner to be used as a developer for developing latent electrostatic images in electrophotography, electrostatic recording, electrostatic printing, and the like. The present invention also relates to a toner produced by means of the production method and relates to a toner production apparatus using the method for producing a toner.

2. Description of the Related Art

A developer used in electrophotography, electrostatic recording, electrostatic printing, or the like is once made adhere on an image bearing member, for example, on a latent electrostatic image bearing member with a latent electrostatic image formed thereon in a developing step, then transferred onto a transferring medium such as a transferring paper sheet from the latent electrostatic image bearing member in a transferring step, and then fixed on the paper surface in a fixing step. In the course of the process, as developers used for developing a latent electrostatic image to be formed on the surface of the latent electrostatic image bearing member with the latent image held thereon, there have been known a two-component developer containing a carrier and a toner, and a one-component toner which requires no carrier (magnetic toner, or nonmagnetic toner).

Conventionally, as dry toners used in electrophotography, electrostatic recording, electrostatic printing, and the like, there have been widely used the dry toners that are prepared by dissolving and kneading a toner binder such as styrene resin, and polyester resin along with a colorant or colorants or the like and pulverizing the materials, so-called as pulverized toner.

In recent years, toner production methods by means of suspension polymerization or emulsification aggregation, so-called polymerized toners are studied. Besides, the method accompanying contractions in volume of toner particles, which is referred to as polymer dissolution suspension method, is also studied (see Japanese Patent Application Laid-Open (JP-A) No. 07-152202). The polymer dissolution suspension method is a method of which toner materials are dispersed and dissolved in a volatile solvent such as an organic solvent having a low-boiling point, the dissolved toner solution is emulsified to be made into droplets in an aqueous medium in which a dispersing agent exists, and then the volatile solvent is removed. Unlike suspension polymerization method, and emulsion aggregation method, the polymer dissolution suspension method has high general versatility of usable resins and excels in that polyester resins useful in full-color process particularly requiring transparency and surface smoothness of fixed images can be used.

In the polymerized toner, however, it is based on the assumption that a dispersing agent is used in an aqueous medium. Thus, there are disadvantages known that environment stability is impaired, because a dispersing agent impairing the charge property of toner remains on the toner surface, and that quite a large amount of washing water is required for removing the dispersing agent. Therefore, such a method for producing a polymerized toner leaves something to be desired.

As a method for producing a toner alternative to the toner production method stated above, a method is proposed in which microscopic droplets are formed using a piezoelectric pulse, and the droplets are dried and solidified to thereby produce a toner (see Japanese Patent Application Laid-Open (JP-A) No. 2003-262976. A method is also proposed in which microscopic droplets are formed utilizing effect of thermal expansion within a nozzle, and the droplets are further dried and solidified to thereby produce a toner (see Japanese Patent Application Laid-Open (JP-A) No. 2003-280236). Further, a method is proposed in which a process similar to the above is performed using an acoustic lens (see Japanese Patent Application Laid-Open (JP-A) No. 2003-262977). However, with these methods, there is a problem with poor productivity, because the number of droplets per unit time of the droplets that can be ejected from a nozzle is small, and it is impossible to avoid widening the particle size distribution caused by coalescence of droplets, and thus it is unsatisfactory in monodispersity.

SUMMARY OF THE INVENTION

The object of the present invention is to provide a method for producing a toner capable of effectively producing a toner to be used as a developer for developing latent electrostatic images in electrophotography, electrostatic recording, electrostatic printing and the like, by which the toner has no variation range of particles in various property values required for a toner such as flowability and charge property particles or has less variations in the property values, although such a variation range of particles have been observed in the conventional toner production methods, by making toner particles have an unprecedented level of monodispersity of particle size, and it is also possible to provide a toner produced by the method for producing a toner and a toner production apparatus using the method for producing a toner.

The means to resolve the problems are as follows:

<1> A method for producing a toner including ejecting a toner composition fluid from a nozzle vibrated at a constant frequency to make the toner composition fluid into droplets, and solidifying the droplets to be made into particles, wherein the toner composition fluid contains a toner composition, and the toner composition contains a resin and a colorant.

<2> A method for producing a toner including ejecting a solution or a dispersion of a toner composition from a nozzle vibrated at a constant frequency to make the solution or the dispersion into droplets, and drying the droplets, wherein the solution or the dispersion of the toner composition contains a resin and a colorant.

In the method for producing a toner according to the items <1> and <2>, it is possible to produce a spherical toner having a monodisperse particle size distribution by applying a vibration to the toner composition fluid or the solution or the dispersion at a constant frequency to induce constrictions to the toner composition fluid or the solution or the dispersion at a certain interval when the toner composition fluid or the solution or the dispersion is ejected from the nozzle, and to make a certain amount of the droplets disparted. Thus, the toner is excellent in uniformity of powder properties typified by charge amount distribution, flowability, and the like, and images extremely true to those latent images can be obtained. In addition, it is possible to obtain images which are excellent in image quality over a long period of time, because the application of mechanical stress can be remarkably reduced owing to the uniformity of the toner shape, and the lifetime of the toner is remarkably prolonged.

<3> The method for producing a toner according to the item <2>, wherein the nozzle is vibrated by use of a vibration generating unit.

<4> The method for producing a toner according to the item <3>, wherein the vibration generating unit makes contact with the nozzle to thereby directly vibrate the nozzle.

<5> The method for producing a toner according to the item <3>, wherein the vibration generating unit is a piezoelectric device, and the nozzle is vibrated at a constant frequency in accordance with expansion and contraction of the piezoelectric device.

In the method for producing a toner according to the item <5>, constrictions of liquid columns are induced in the toner composition fluid or the solution or the dispersion ejected from the nozzle by a constant vibration, and the toner composition fluid or the solution or the dispersion is split into droplets at the front edges of the liquid columns, and thus it is possible to consecutively produce solid particles constantly having a certain particle diameter.

<6> The method for producing a toner according to the item <2>, wherein the nozzle is provided with an ejection hole formed with a metal plate having a thickness of 5 μm to 50 μm, and the ejection hole has an aperture diameter of 3 μm to 35 μm.

<7> The method for producing a toner according to the item <2>, wherein any one of a positive charge and a negative charge is applied to the droplets ejected from the nozzle by means of electrostatic induction.

In the method for producing a toner according to the item <7>, by applying any one of a positive charge and a negative charge to the droplets ejected from the nozzle by induction of charge, it is possible to obtain toner particles which keep an extremely monodisperse particle size distribution, without causing coalescence of droplets or solidified particles caused from electrostatic repulsion.

<8> The method for producing a toner according to the item <7>, wherein the electrostatic induction is performed by passing the droplets ejected from the nozzle through between a pair of electrodes with a direct-current voltage applied thereto.

<9> The method for producing a toner according to the item <2>, wherein the solution or the dispersion of the toner composition which contains the resin and the colorant has an electrolytic conductivity of $1.0 \times 10^{-7}$ S/m or more.

<10> The method for producing a toner according to the item <2>, wherein a solvent used for the solution or the dispersion of the toner composition which contains the resin and the colorant has an electrolytic conductivity of $1.0 \times 10^{-7}$ S/m or more.

<11> The method for producing a toner according to the item <2>, wherein a dry gas is flowed in the same direction as the ejected droplets to thereby generate an airflow, and the airflow conveys the droplets within a solvent removal system to remove the solvent in the droplets in the course of the conveyance to thereby form toner particles.

In the method for producing a toner according to the item <11>, by flowing the dry gas in the same direction as the ejected droplets to generate an airflow, and conveying the droplets in the solvent removal system by means of the airflow, it is unnecessary to provide a toner conveying mechanism, and this method is applicable to new developing methods.

<12> The method for producing a toner according to the item <11>, wherein the dry gas is any one of air and a nitrogen gas.

<13> The method for producing a toner according to the item <11>, wherein the temperature of the dry gas is 40° C. to 200° C.

<14> The method for producing a toner according to the item <2>, wherein the solvent removal system is provided with a carrier path surrounded by an electrostatic curtain which is charged with a reverse polarity from the charge polarity of the droplets, and the droplets are passed through the carrier path.

<15> A toner produced by a method for producing a toner which includes ejecting a solution or a dispersion of a toner composition from a nozzle vibrated at a constant frequency to make the solution or the dispersion into droplets, and drying the droplets, wherein the solution or the dispersion of the toner composition contains a resin and a colorant.

<16> The toner according to the item <15>, having a particle size distribution (weight average particle diameter/number average particle diameter) of 1.00 to 1.05.

<17> The toner according to the item <16>, having a weight average particle diameter of 1 μm to 20 μm.

<18> A toner production apparatus including
a droplet forming unit configured to form droplets by ejecting a solution or a dispersion of a toner composition which contains a resin and a colorant from a nozzle vibrated at a constant frequency, and a toner particle forming unit configured to form toner particles by removing a solvent contained in the droplets and drying the droplets.

<19> The toner production apparatus according to the item <18>, wherein the droplet forming unit includes a vibration generating unit configured to directly vibrate the nozzle.

<20> The toner production apparatus according to the item <19>, wherein the vibration generating unit is configured to vibrate the nozzle at the same time as the solution or the dispersion is passing through the nozzle.

<21> The toner production apparatus according to the item <18>, further including a retention unit configured to retain the solution or the dispersion of the toner composition therein to supply the solution or the dispersion of the toner composition to the droplet forming unit.

<22> The toner production apparatus according to the item <18>, wherein the nozzle is vibrated at a constant frequency in accordance with expansion and contraction of a piezoelectric device, and the number of ejection holes of the nozzle is 1 to 300.

<23> The toner production apparatus according to the item <18>, having a plurality of nozzles, and droplets ejected from each of the plurality of nozzles are dried in a solvent removal system.

<24> The toner production apparatus according to the item <18>, wherein the constant frequency is 50 kHz to 50 MHz.

<25> The toner production apparatus according to the item <18>, wherein the constant frequency is 100 kHz to 10 MHz.

<26> The toner production apparatus according to the item <18>, wherein the charge of toner particles formed by passing the droplets through a carrier path is temporarily neutralized by use of a charge eliminating device, and then the toner particles are housed in a toner trapping part.

<27> The toner production apparatus according to the item <26>, wherein the elimination of charge by use of the charge eliminating device is performed with use of a soft X-ray irradiation.

<28> The toner production apparatus according to the item <26>, wherein the elimination of charge through the use of the charge eliminating device is performed with use of a plasma irradiation.

<29> The toner production apparatus according to the item <18>, wherein the toner trapping part for trapping toner particles is provided with a taper surface with the aperture diameter thereof is gradually narrowed, a dry gas is used to form a flow of the dry gas at the toner trapping part, and the flow of the dry gas makes the toner particles transferred from the outlet part having an aperture diameter narrower than that of the inlet part to a toner storage vessel.

<30> The toner production apparatus according to the item <29>, wherein the flow of the dry gas is a vortex flow.

<31> The toner production apparatus according to the item <18>, wherein both the toner trapping part and the toner storage vessel are respectively formed with a conductive material and are connected to an earth lead.

<32> The toner production apparatus according to the item <18>, wherein the toner production apparatus is based on an explosion-proof specification.

DESCRIPTION OF THE PREFERRED EMBODIMENTS (Toner Production Method)

The method for producing a toner of the present invention is characterized in that a toner composition fluid containing a resin and a colorant is ejected from a nozzle which is vibrated at a constant frequency to make the ejected toner composition fluid into droplets, and the droplets are solidified and made into particles. Namely, the method for producing a toner of the present invention is characterized in that a solution or a dispersion of a toner composition containing a resin and a colorant is ejected from a nozzle which is vibrated at a constant frequency to make the ejected solution or dispersion into droplets, and the droplets are dried.

—Apparatus—

The apparatus to be used for the method for producing a toner of the present invention (hereinafter, may be referred to as "toner production apparatus") is not particularly limited, provided that it is an apparatus by which a toner can be produced by the method for producing a toner, and the apparatus may be suitably selected from those in the art. However, it is preferable to use a toner production apparatus having a droplet forming unit configured to form droplets by ejecting a solution or a dispersion of a toner composition containing a resin and a colorant from a nozzle vibrated at a constant frequency, and a toner particle forming unit configured to form toner particles by removing a solvent contained in the droplets and drying the droplets. In the toner production apparatus, the droplet forming unit is provided with a vibration generating unit configured to directly vibrate the nozzle. More preferably, the vibration generating unit vibrates the nozzle at the same time as the solution or the dispersion is passing through the nozzle. In addition, it is more preferably that the apparatus is further provided with a retention unit configured to retain the solution or the dispersion of the toner composition therein to supply the solution or the dispersion to the droplet forming unit.

Figure 1:
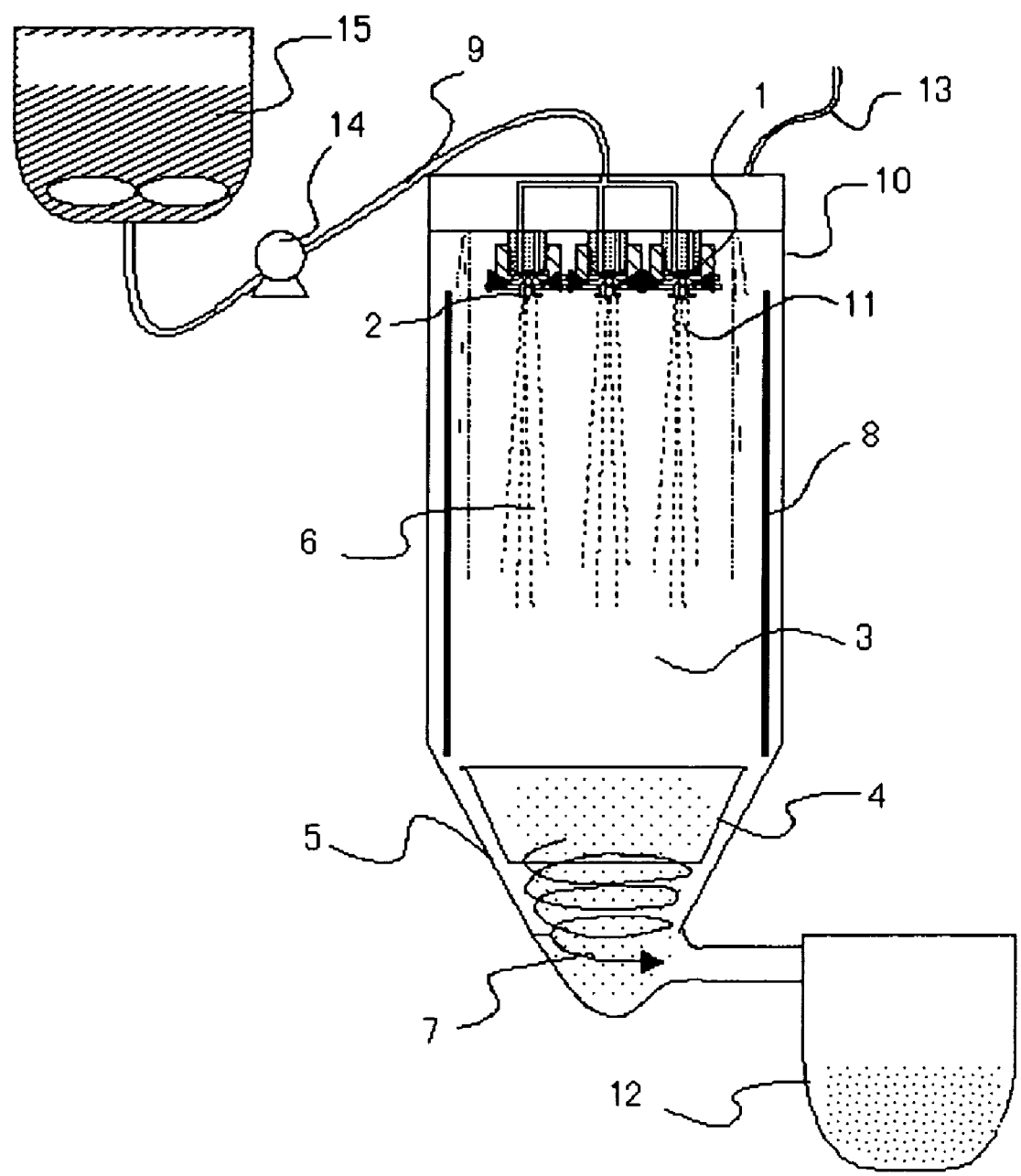
FIG. 1 is a schematic view exemplarily showing the toner production apparatus of the present invention which is provided with a nozzle.
Figure 2:
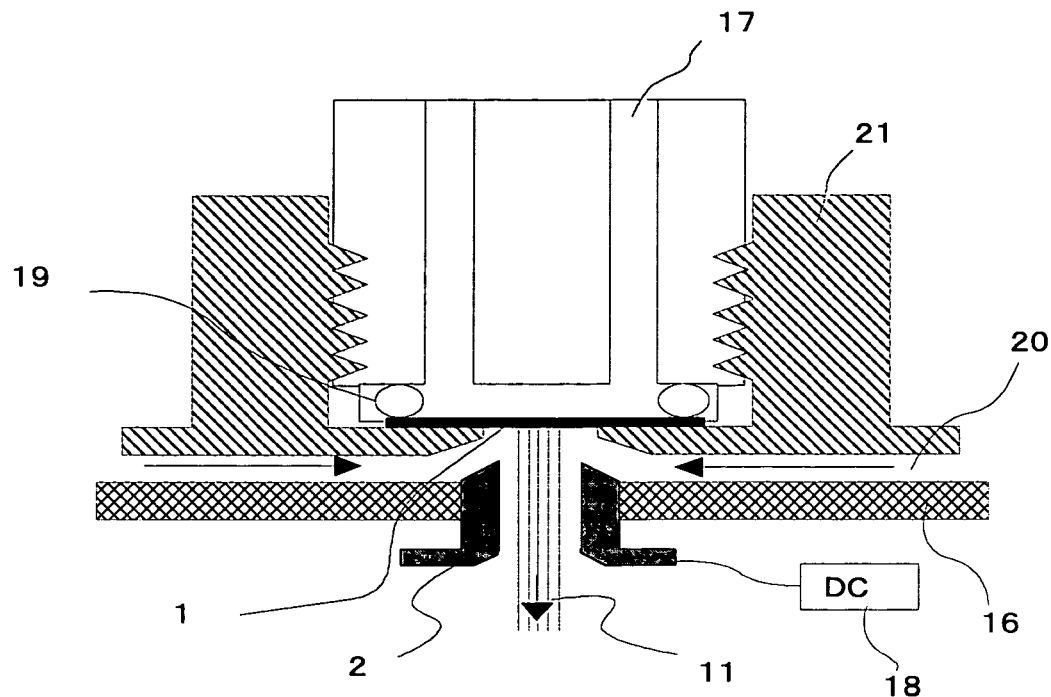
FIG. 2 is a schematic view of the nozzle part of the toner production apparatus of the present invention enlarged.

Preferred examples of the toner production apparatus include, as shown in FIG. 1, an apparatus having slurry retention vessel 15; nozzle 1 and electrodes 2 serving as the droplet forming unit mounted in drying container 10; solvent removal system 3 serving as the toner particle forming unit; charge eliminating device 4; and toner storage vessel 12, and an apparatus having piezoelectric device 21 serving as the vibration generating unit, as shown in FIG. 2.

In the toner production apparatus shown in FIG. 1, the solution or the dispersion retained in the slurry retention vessel 15 is supplied to the nozzle 1 through solution conveying tube 9 while suitably adjusting the supplied amount of the solution or the dispersion by use of solution determination pump 14 to eject the solution or the dispersion as droplets 11, the droplets 11 are charged by means of the electrodes 2, the solvent used in the solution or the dispersion is removed in the solvent removal system 3 to thereby make the droplets into toner particles 6, and then the toner particles 6 are subjected to a removal of charge using the charge eliminating device 4 and then trapped in toner trapping part 5 by means of vortex flow 7 and then conveyed into the toner storage vessel 12.

Hereinafter, each of the members of the toner production apparatus will be described in detail.

—Nozzle and Piezoelectric Substance—

The nozzle 1 is, as described above, a member to eject the solution or the dispersion of the toner composition to make the solution into droplets.

The material and the shape of the nozzle are not particularly limited and may be suitably selected in accordance with the necessity. For example, it is preferable that an ejection hole is formed with a metal plate having a thickness of 5 μm to 35 μm, and the aperture diameter thereof is 3 μm to 50 μm from the perspective that microscopic droplets having an extremely uniform particle diameter are generated by applying a vibration to the nozzle 1 itself when the solution or the dispersion is sprayed from the nozzle 1 so as to impart a shearing force to the solution or the dispersion. It should be noted that the aperture diameter means a diameter when the aperture is formed in a round shape, and it means a miner axis when the aperture is formed in an ellipsoidal shape.

The unit to apply a vibration to the nozzle 1 is not particularly limited, provided that a vibration can be assuredly applied at a constant frequency, and may be suitably selected for use, however, from the above-noted viewpoints, for example, as shown in FIG. 2, it is preferable that the nozzle 1 is vibrated at a constant frequency in accordance with expansion and contraction of the piezoelectric device 21.

The piezoelectric device 21 has a function to convert an electric energy into a mechanical energy. Specifically, by applying a voltage to the piezoelectric device 21, the piezoelectric device 21 can be expanded and contracted, and the expansion and contraction enables the nozzle 1 to vibrate.

Examples of materials used for the piezoelectric device include piezoelectric ceramics such as lead zirconate titanate (PZT). Since a lead zirconate titanate (PZT) has a small displacement amount, in many cases, it may be used in a laminar structure. Besides, examples of the materials used for piezoelectric device include piezoelectric polymers such as polyvinylidene fluoride (PVDF), and single crystals such as crystal quartz, $LiNbO_3$, $LiTaO_3$, and $KnbO_3$.

The constant frequency is not particularly limited, may be suitably selected in accordance with the intended use, however, the constant frequency is preferably 50 kHz to 50 MHz, more preferably 100 kHz to 10 MHz, and particularly preferably 100 kHz to 450 kHz from the perspective of generating microscopic droplets having an extremely uniform particle diameter.

The nozzle 1 may be singly mounted, however, it is preferable that a plurality of nozzles is mounted and the droplets 6 ejected from each of the nozzles are dried in a solvent removal system like the solvent removal system 3 as exemplarily shown in FIG. 1.

With respect to the piezoelectric device 21, from the same viewpoint just as with the nozzle 1, it is also preferable that the ejection hole is vibrated by means of a piezoelectric device.

Here, for the piezoelectric device 21 and the nozzle 1, it is preferable that it is structured such that, as shown in FIG. 2, at least part of the nozzle makes contact with the piezoelectric device, and vibrations generated by expansion and contraction from the piezoelectric device directly vibrate the nozzle. With this configuration, even when droplets of the solution or the dispersion are concurrently ejected from a plurality of nozzles mounted at one metal plate by means of vibrations from one piezoelectric device, it is possible to eject more monodisperse droplets than in the case where vibrations from a piezoelectric device are given to the nozzle through other media, for example, liquid filled in a liquid chamber. It is presumed that when vibrations are given to the nozzle through liquid, the speed that vibrations are transmitted to the nozzle differs depending on the distance between the nozzle and the piezoelectric device. For the reason, when a plurality of nozzles is mounted, time-lag occurs at droplets ejected from each of the nozzles, and the ejected amount of droplets differs between the plurality of nozzles. Even in the method in which vibrations are given to the nozzle through liquid within a liquid chamber, variations in ejected amount of droplets can be fairly prevented when droplets of the solution or the dispersion are ejected from one nozzle by giving vibrations from one piezoelectric device. However, in order to make droplets ejected from a plurality of nozzles while considering the productivity, it is unfavorable because the same number of piezoelectric devices as that of nozzles is required.

The toner production apparatus shown in FIG. 2 will be further described below. The toner production apparatus is provided with insulating substrate 16, liquid supply passage 17, direct current high voltage power source 18, and O ring 19. Piezoelectric substance 21 is expanded and contacted to be in contact with nozzle 1, thereby making the solution or the dispersion supplied through the liquid supply passage 17, which is mounted at a distance from the nozzle 1 and the O ring 19, into droplets 11. The solution or the dispersion is to be sent and supplied to electrodes 2 to which a direct-current voltage is applied from the direct current high voltage power source 18 through dispersed air 20. It should be noted that the direct current high voltage is not to be given to sites other than the electrodes 2 by disposing the insulating substance 16.

The number of ejection holes of the nozzle vibrated by means of the piezoelectric device is not particularly limited, however, in order to more assuredly generate microscopic droplets having an extremely uniform particle diameter, the number of ejection holes is preferably 1 to 300. Thus, the number of nozzles is preferably 1 to 15, and the number of ejection holes of the nozzle 1 is preferably 1 to 20 per nozzle.

—Electrode—

The electrodes 2 are a member to make droplets 11 ejected from the nozzle 1 charged to make the droplets into monodisperse particles.

The electrodes 2 are a pair of members mounted so as face the nozzle 1, and the shape of the electrodes is not particularly limited and may be suitably selected in accordance with the intended use, for example, it is preferably formed, as shown in FIG. 2, in a ring shape.

The method for charging the electrodes 2 (hereinafter, may be referred to as "ring-shaped electrode) is not particularly limited, for example, it is preferable that a positive charge or a negative charge is applied to the droplets 11 by induction of charge from the perspective that a certain amount of charge can be constantly given to the droplets 11 ejected from the nozzle 1. More specifically, it is preferable that the induction of charge is performed by passing the droplets through the ring-shaped electrodes to which a direct current voltage is applied.

Further, for the charge induction method, it is also possible to directly apply a direct current voltage to the nozzle to induce potential differences between the nozzle and an earth lead arranged at the base of the drying container to thereby make the droplets charged. In this case, an electric potential can be applied through the dissolved or the dispersion of the conductive toner retained in the slurry retention vessel 15. When the solution supplied to the slurry retention vessel 15 is insulated by utilizing air pressure or the like, the charge induction is relatively easily achieved.

The event that droplets in an airflow are highly charged has been already demonstrated in electro-spray methods and methods for producing fine particles by means of an electrostatic spray. In this case, it is possible, in principle, to maintain a charge amount higher than the charge amount applied to a solid substance by use of reduction effect of the surface area of droplets which is caused by vaporized volatile components, and further highly charged solid particles can be obtained.

—Solvent Removal System—

The solvent removal system 3 is not particularly limited, provided that the solvent in the droplets 11 can be removed. For example, it is preferable that an airflow is induced by flowing a dry gas in the same direction as the droplets 11 are ejected, the droplets 11 are conveyed into the solvent removal system 3 by means of the airflow, and the solvent in the droplets 11 is removed during the conveyance, to thereby form toner particles 6. Here, the term "dry gas" means a gas in a state where the dew-point temperature under atmospheric pressure is −10° C. or less.

The dry gas is not particularly limited, provided that the droplets 11 can be dried. Preferred examples thereof include air, and nitrogen gases.

The method for flowing the dry gas into the solvent removal system 3 is not particularly limited. Examples thereof include, as shown in FIG. 1, a method for flowing a dry gas through dry gas supply tube 13.

The dry gas preferably has a high temperature in terms of drying efficiency. Even when a dry gas having a boiling point higher than that of the solvent to be used is employed, the temperature of the droplets will never be increased more than the boiling point of the solvent in the constant-drying-rate area in the course of drying owing to spray drying properties, and thus a toner to be obtained will not suffer from thermal damages. However, since the main constituent material of the toner is a thermoplastic toner, toner particles are thermally fused each other with ease after drying, namely, when the thermoplastic resin is exposed to a dry gas having a temperature higher than the boiling point of the resin in the decreasing-drying-rate area, it involves the risk that the monodispersity of toner is impaired. Thus, specifically, the temperature of the dry gas is preferably 40° C. to 200° C., more preferably 60° C. to 150° C., and particularly preferably 75° C. to 85° C.

In addition, as shown in FIG. 1, from the perspective of preventing the droplets 11 from adhering on the internal surface of the solvent removal system 3, it is preferable that electric field curtain 8 which is charged with a reverse polarity from the charge polarity of the droplets 11 is arranged on the internal surface of the solvent removal system 3 to form a carrier path surrounded by the electric field curtain 8 and then to pass the droplets to the carrier path.

—Charge Eliminating Device—

The charge eliminating device is a member to temporarily neutralize the charged toner particles 7 formed by passing the droplets 11 through the carrier path to be housed in the toner trapping part 5.

The method for eliminating the charge by means of the charge eliminating device 4 is not particularly limited and may be suitably selected from those known in the art. It is preferable to eliminate the charge by means of, for example, soft X-ray irradiation, and plasma irradiation, from the perspective that the charge can be effectively eliminated.

—Toner Trapping Part—

The toner trapping part 5 is a member mounted at the bottom of the toner production apparatus in order to effectively trap and convey toner.

The structure of the toner trapping part 5 is not particularly limited as far as it can trap the toner, and may be suitably selected in accordance with the intended use. However, from the viewpoint stated above, as exemplarily shown in FIG. 1, it is preferable that the toner trapping part is provided with a taper surface of which the aperture diameter is gradually narrowed so as to form a flow of the dry gas and transfer the toner particles 6 from the outlet part with the aperture diameter thereof being narrower than that of the inlet part to the toner storage vessel 12 through use of the flow of the dry gas.

With respect to the method for transferring the toner particles, like an example shown in FIG. 1, toner particles 6 may be pressurized and then sent to the toner storage vessel 12, or toner particles 6 may be sucked from the toner storage vessel 12.

The flow of the dry gas is not particularly limited, however, it is preferably a vortex flow from the perspective of capability of generating a centrifugal force and assuredly transferring the toner particles 6.

Further, it is preferable that the toner trapping part 5 and the toner storage vessel 12 are respectively made of a conductive material, and both of them are connected to an earth lead from the perspective that the conveyance of the toner particles 6 is effectively performed. In addition, the toner production apparatus is preferably based on an explosion-proof specification.

—Droplets—

The droplets 6 are generated, as mentioned above, by ejecting the solution or the dispersion of the toner composition containing specific substances from the nozzle 1 vibrated at a constant frequency. It should be noted that the toner composition will be described hereinafter in the section of "toner".

The solution or the dispersion of the toner composition is not particularly limited, provided that any one of dissolution of the toner composition and dispersion of the toner composition is performed, and may be suitably selected for use. However, the solution or the dispersion preferably has an electrolytic conductivity of $1.0 \times 10^{-7}$ S/m or more from the perspective of maintaining a high-charge amount.

From the perspective similar to the above mentioned, the solvent used for the solution or the dispersion preferably has an electrolytic conductivity of $1.0 \times 10^{-7}$ S/m or more.

The method for dissolving or dispersing the toner composition is not particularly limited and may be suitably selected from those typically used. Specifically, a toner binder such as a styrene acrylic resin, a polyester resin, and a polyol resin may be fused and kneaded along with a colorant or colorants and the like and then pulverized into fine particles, or the kneaded materials obtained in the course of the above process may be once dissolved in an organic solvent to which resin components are soluble, and then the dissolved solution may be used as microscopic particles.

—Effect—

According to the method for producing a toner of the present invention described above in detail, the number of droplets generated from the ejection holes of the nozzle 1 is considerably large i.e several tens of thousands of droplets per second to millions of droplets per second, and it is possible to further increase the number of ejection holes with ease. In addition, droplets having an extremely uniform diameter can be obtained, and the method for producing a toner can be said as the most suitable method for producing a toner from the perspective that it yields sufficient productivity. Further, in the present invention, the particle diameter of a toner to be finally obtained can be determined with accuracy by use of the following Equation (1), and there is little difference in particle diameter depending on the materials used.

$$Dp = (6QC/\pi f)^{(1/3)} \qquad \text{Equation (1)}$$

In Equation (1), Dp represents a solid particle diameter, Q represents a flow rate of solution (determined depending on the pump flow rate and the nozzle diameter), "f" represents a vibration frequency, and C represents a volume concentration of solid parts.

The toner particle diameter can be accurately calculated with Equation (1), however, more simply, the toner particle diameter can be calculated with the Equation (2).

$$\text{Volume concentration of solid parts (\% by volume)} = (\text{Solic particle diameter/Droplet diameter})^3 \qquad \text{Equation (2)}$$

Namely, the diameter of toner particles obtainable from the present invention is two times the aperture diameter of the nozzle, not depending upon the vibration frequency serving to spray droplets. Then, it is possible to obtain an intended solid particle diameter by preliminarily calculating the concentration of solid parts and adjusting it. For example, when the nozzle diameter is 7.5 μm, the droplet diameter is 15 μm. Then, when the volume concentration of solid parts is set to 6.40% by volume, solid particles having a particle diameter of 6.0 μm can be obtained. In this case, the higher the vibration frequency is the more desirable in terms of productivity, however, the flow rate Q is to be determined from Equation (1) using the vibration frequency determined here.

In conventional toner production methods, in many cases, the toner particle size largely differs depending on the material used, however, with the method for producing a toner of the present invention, it is possible to consecutively obtain toner particles having a particle diameter as preliminarily set by controlling the droplet diameter and the volume concentration of solid parts when the droplets are ejected.

Since a toner obtained by the method for producing a toner of the present invention has an extremely uniform particle diameter, the flowability of toner base particles is substantially high. Thus, even when external additives are added to the toner composition for the purpose of reducing adhesiveness to a toner production apparatuses or the like, the effect can be exerted with a very small amount of external additives. In consideration of deterioration of external additives caused by stresses, and harmful influence of fine particles on the human body, it is preferred to use as few such external additives as possible, and thus this can be said as an advantage of the present invention.

(Toner)

The toner of the present invention is a toner produced by the aforesaid method for producing a toner.

By employing the method for producing a toner, it is possible to obtain a toner having a monodisperse particle size distribution.

Specifically, the particle size distribution (weight average particle diameter/number average particle diameter) of the toner is preferably in the range of 1.00 to 1.05. The weight average particle diameter is preferably 1 µm to 20 µm.

A toner obtained by the method for producing a toner can be easily re-dispersed or suspended in an airflow by means of electrostatic repulsion effect. For the reason, it is possible to easily convey the toner to the developing area without using a conveying unit as utilized in conventional electrophotography systems. Namely, the toner has a high conveying property enough to be conveyed with a weak airflow, and the toner can be conveyed to the developing area with a simple air pump to be directly developed. The developing is so-called power cloud developing, and it is possible to perform extremely favorable developing of latent electrostatic images because there is no distortion of images caused by airflow. In addition, the toner of the present invention can be applied to conventional developing methods without causing problems. Members such as a carrier, and a developing sleeve are simply used as a toner conveying unit, and there is no need to consider a conventional frictional charge mechanism which bears part of the function. Thus, since the selection of materials is largely widen, it is possible to largely increase the durability as well as to reduce the cost by using inexpensive materials.

The same materials used in conventional electrophotographic toner can be used for the toner composition in the present invention. Namely, intended toner particles can be prepared by dissolving a toner binder such as styrene acrylic resin, a polyester resin, a polyol resin, and epoxy resin in an organic solvent, dispersing a colorant or colorants in the organic solvent, dispersing or dissolving a releasing agent in the organic solvent, making the solvent into microscopic droplets, and drying and solidifying the microscopic droplets. In addition, it is also possible to obtain an intended toner by the following method. Namely, a solution of which the kneaded materials obtained by thermally fusing and kneading the toner composition is once dissolved and dispersed in a solvent is made into microscopic droplets by the method for producing a toner, and the microscopic droplets are dried and solidified for reducing the solvent.

—Toner Materials—

The toner composition contains a resin and a colorant and further contain other components such as a carrier and a wax in accordance with the necessity.

—Resin—

Examples of the resin include binder resins.

The binder resin is not particularly limited and may be suitably selected from typically used resins. Examples thereof include vinyl polymers such as styrene monomers, acrylic monomers, and methacrylic monomers, copolymers of monomers thereof or copolymers prepared using two or more of the monomers, polyester polymers, polyol resins, phenol resins, silicone resins, polyurethane resins, polyamide resins, furan resins, epoxy resins, xylene resins, terpene resins, coumarone-indene resins, polycarbonate resins, and oil resins.

Examples of the styrene monomers include styrenes such as o-methylstyrene, m-methylstyrene, p-methylstyrene, p-phenylstyrene, p-ethylstyrene, 2,4-dimethylstyrene, p-n-anylstyrene, p-tert-butylstyrene, p-n-hexylstyrene, p-n-octylstyrene, p-n-nonylstyrene, p-n-decylstyrene, p-n-dodecylstyrene, p-methoxystyrene, p-chlorostyrene, 3,4-dichlorostyrene, m-nitrostyrene, o-nitrostyrene, p-nitrosyrene; and derivatives thereof.

Examples of the acrylic monomers include acrylates such as methyl acrylates, ethyl acrylates, propyl acrylates, n-butyl acrylates, isobutyl acrylates, n-octyl acrylates, n-dodecyl acrylates, 2-ethylhexyl acrylates, stearyl acrylates, 2-chloroethyl acrylates, phenyl acrylates, and esters thereof.

Examples of the methacrylic monodmers include methacrylates such as methyl methacrylates, ethyl methacrylates, propyl methacrylates, n-butyl methacrylates, isobutylmethacrylates, n-octyl methacrylates, n-dodecyl methacrylates, 2-ethylhexyl methacrylates, stearyl methacrylates, phenyl methacrylates, dimethylamino methacrylates, and diethylaminoethyl methacrylates; or esters thereof.

Examples of other monomers forming the vinyl polymers or the copolymers include the following ones (1) to (18): (1) monoolefines such as ethylene, propylene, butylene, and isobutylene; (2) polyenes such as butadiene and isoprene; (3) halogenated vinyls such as vinyl chlorides, vinylidene chlorides, vinyl bromides, and vinyl fluorides; (4) vinyl esters such as vinyl acetates, vinyl propionates, and vinyl benzoates; (5) vinyl ethers such as vinylmethyl ethers, vinylethyl ethers, and vinylisobutyl ethers; (6) vinyl ketones such as vinyl ethyl ketone, vinyl hexyl ketone, and methyl isopropenyl ketone; (7) N-vinyl compounds such as N-vinylpyrrole, N-vinyl carbazole, N-vinyl indoles, and N-vinyl pyrolidone; (8) vinyl naphthalenes; (9) acrylic derivatives or methacrylic derivatives such as acrylonitrile, methacrylonitrile, and acrylamide; (10) unsaturated dibasic acids such as maleic acids, citraconic acids, itaconic acids, alkenyl succinic acids, fumaric acids, and mesaconic acids; (11) unsaturated dibasic acid anhydrides such as maleic acid anhydrides, citraconic acid anhydrides, and alkenyl succinic acid anhydrides; (12) unsaturated dibasic acid monoesters such as maleic acid monomethylesters, maleic acid monoethylesters, maleic acid monobutylesters, citraconic acid monomethylesters, citraconic acid monoethylesters, citraconic acid monobutylesters, itaconic acid monomethylesters, alkenyl succinic acid monomethylesters, fumaric acid monomethylesters, and mesaconic acid monomethylesters; (13) unsaturated dibasic acid esters such as dimethyl maleic acids, and dimethyl fumaric acids; (14) α-unsaturated acids, or β-unsaturated acids such as crotonic acid anhydrides, and cinnamic acid anhydrides; (16) monomers having a carboxylic group such as anhydrides of the α-unsaturated acid, or β-unsaturated acid and a lower aliphatic acid, alkenyl malonic acids, alkenyl glutaric acids, alkenyl adipic acids, acid anhydrides thereof, and monoesters thereof; (17) acrylic acid hydroxyalkylesters or methacrylic acid hydroxyalkylesters such as 2-hydroxyethylacrylate, 2-hydroxyethylmethacrylate, 2-hydroxypropylmethacryate, 2-hydroxypropylmethacrylates; and (18) monomers having a hydroxy group such as 4-(-hydroxy-1-methylbutyl)styrene, and 4-(1-hydroxy-1-methylhexyl)styrene.

In the present invention, vinyl polymers or copolymers as the binder resins may respectively have a cross-linked structure in which a vinyl polymer or a copolymer is cross-linked by use of a crosslinker having two or more vinyl groups. Examples of the crosslinker used in this case include aromatic divinyl compounds such as such as divinylbenzene, and divinylnaphthalene. Examples of diacrylate compounds which are bound with an alkyl chain include diethyleneglycoldiacrylate, triethyleneglycoldiacrylate, tetraethylene glycoldiacrylate, polyethyleneglycol#400diaclylate, polyethylene glycol#600diaclylate, dipropylene glycoldiacrylate, and compounds of which the acrylate of these compounds is replaced by methacrylate.

Besides the above stated, there are diacrylate compounds, and dimethacrylate compounds each of which are bound with a binding chain containing an aromatic group and ether binding. Commercially available polyester diacrylate include MANDA (manufactured by Nippon Kayaku Co., Ltd.).

Examples of polyfunctional crosslinkers include pentaerythritol triacrylates, trimethylol ethane triacrylates, trimethylol propane triacrylates, tetramethylol methane tetraacrylates, oligoester acrylates, compounds of which the acrylate of these compounds is replaced by methacrylate, triallyl cyanurates, and triallyl trimellitates.

These crosslinkers are preferably used in an amount of 0.01 parts by mass to 10 parts by mass, and more preferably used in an amount of 0.03 parts by mass to 5 parts by mass relative to 100 parts by mass of other monomer components. Of these cross-linked monomers, aromatic divinyl compounds particularly divinyl benzene, and diacrylate compounds each of which are bound with a binding chain containing an aromatic group and ether binding are preferably used in terms of fixing property relative to a resin used as a toner material and anti-offset property. Of these, it is preferable to select a combination of monomers so as to obtain a styrene copolymer or a styrene-acrylic acid copolymer.

Examples of polymerization initiators to be used in the vinyl polymer or the vinyl copolymer in the method for producing a toner of the present invention include ketone peroxides such as 2,2'-azobis isobutylonitrile; 2-2'-azobis(4-methoxy-2,4-dimethylvaleronitrile); 2,2'-azobis(2,4-dimethylvaleronitrile); 2,2'-azobis(2-methylbutylonitrile); dimethyl-2,2'-azobis isobutylate; 1,1'-azobis(1-cychlohexane carbonitrile); 2-(carbamonylazo)-isobutylonitrile; 2,2'-azobis(2,4,4-trimethylpentane); 2-phenylazo-2'4'-dimethyl-4'-methoxyvaleronitrile; 2,2'-azobis (2-methylpropane); methyl ethyl ketone peroxide, acetylacetone peroxide, and cyclohexanon peroxide; and 2,2-bis(tert-butylperoxy)butane; tert-butyl hydroperoxide, cumene hydroperoxide; 1,1,3,3-tetramethylbutyl hydroperoxide; di-tert-butylperoxide; tert-butylcumyl peroxide; di-cumyl peroxide; α-(tert-butyl peroxy)isopropyl benzene; isobutyl peroxide, octanoil peroxide; decanoil peroxide; lauroyl peroxide; 3,5,5-trimethylhexanoil peroxide; benzoyl peroxide; m-tlyl peroxide; di-isopropyl peroxydicarbonate; di-2-ethylhexyl peroxydicarbonate, di-n-propyl peroxydicarbonate; di-2-ethoxyethyl peroxycarbonate; di-ethoxyisopropyl peroxydicarbonate; di(3-methyl-3-methoxybuty) peroxy carbonate, acetylcyclohexylsulfonyl peroxide; tert-butyl peroxyacetate; tert-butyl peroxyisobutylate; tert-butyl peroxy-2-ethylhexalate; tert-butyl peroxylaurate; tert-butyl-oxybenzoate; tert-butyl peroxy isopropylcabonate; di-tert-butyl peroxy isophthalate; tert-butyl peroxy allylcarbonate; isoamyl peroxy-2-ethylhexanoate; di-tert-butyl peroxy hexahydroterephthalate; and tert-butyl peroxy azelate.

When the binder resin is a styrene-acrylic resin, in the molecular mass distribution of tetrahydrofuran (THF)-soluble parts in the resin components determined by GPC, a resin having at least one peak in an area of the number average molecular mass of 3,000 to 50,000 and having at least one peak in an area of a molecular mass of 100,000 or more is preferably used in terms of fixing property, off-set property, and storage stability. As for the THF-soluble parts, such a binder resin of which a component having a number average molecular mass of 100,000 or less exists at 50% to 90% is preferably used; a binder resin having the main peak in an area of the number average molecular mass of 5,000 to 30,000 is more preferably used; and a binder resin having the main peak in an area of a molecular mass of 5,000 to 20,000 is most preferably used.

When the binder resin is a vinyl polymer such as styrene-acrylic resin, the acid value is preferably 0.1 mgKOH/g to 100 mgKOH/g, more preferably 0.1 mgKOH/g to 70 mgKOH/g, and most preferably 0.1 mgKOH/g to 50 mgKOH/g.

Monomers constituting a polyester polymer are as follows:

Examples of divalent alcohol components include ethylene glycols, propylene glycols, 1,3-butanediol, 1,4-butanediol, 2,3-butanediol, diethylene glycols, triethylene glycols, 1,5-pentanediol; 1,6-hexanediol, neopentyl glycols; 2-ethyl-1,3-hyxandiol, and diols that can be obtained by polymerizing a cyclic ether such as ethylene oxide and propylene oxide with hydrogenated bisphenol A or bisphenol A.

To make a polyester resin cross-linked, it is preferable to use trivalent or more alcohol together.

Examples of the trivalent or more alcohols include sorbitols, 1,2,3,6-hexanetetrol, 1,4-solbitane, pentaerythritol, dipentaerythritol, tripentaerythritol, 1,2,4-butanetriol, 1,2,5-pentatriol, glycerol, 2-methylpropanetriol, 2-methyl-1,2,4-butanetriol, trimethyrolethane, trimethyrolpropane, and 1,3,5-trihydroxybenzene.

Examples of acid components forming a polyester polymer include benzene dicarboxylic acids such as phthalic acids, isophthalic acids, terephthalic acids and anhydrides thereof; alkyldicarboxylic acids such as succinic acids, adipic acids, sebacic acids, azelaic acids, and anhydrides thereof; unsaturated dibasic acids such as maleic acids, citraconic acids, itaconic acids, alkenyl succinic acids, fumaric acids, and mesaconic acids; and unsaturated dibasic acid anhydrides such as maleic acid anhydrides, citraconic acid anhydrides, itaconic acid anhydrides, and alkenyl succinic acid anhydrides. Examples of the trivalent or more polyvalent carboxylic acid components include trimeritic acids, pyromeritic acids, 1,2,4-benzene tricarboxylic acid, 1,2,5-benzene tricarboxylic acid, 2,5,7-naphthalene tricarboxylic acid, 1,2,4-naphthalene tricarboxylic acid, 1,2,4-butane tricarboxylic acid, 1,2,5-hexane tricarboxylic acid, 1,3-dicarboxy-2-methyl-2-methylene carboxypropane, tetra(methylene carboxy) methan, 1,2,7,8-octane tetracarboxylic acid, empol trimeric acids, anhydrides thereof, and partially lower alkyl esters.

When the binder resin is a polyester resin, in the molecular mass distribution of tetrahydrofuran (THF)-soluble parts in the resin components determined by GPC, a resin having at least one peak in an area of the number average molecular mass of 3,000 to 50,000 is preferably used in terms of fixing property, and anti-off-set property of toner. As for the THF-soluble parts, such a binder resin that the component having a number average molecular mass of 100,000 or less exists at 60% to 100% is preferably used, and a binder resin having at least one peak in an area of a molecular mass of 5,000 to 20,000 is more preferably used.

When the binder resin is a polyester resin, the acid value is preferably 0.1 mgKOH/g to 100 mgKOH/g, more preferably 0.1 mgKOH/g to 70 mgKOH/g, and most preferably 0.1 mgKOH/g to 50 mgKOH/g.

In the present invention, the molecular mass distribution of the binder resin is determined by means of gel permeation chromatography (GPC) using tetrahydrofuran (THF) as a solvent.

For the binder resins usable for the toner of the present invention, in at least one of the vinyl polymer component and polyester resin component, resins containing monomer components capable of reacting with both of the resin components can also be used. Among monomers constituting a polyester resin, monomers capable of reacting with vinyl polymer are, for example, unsaturated dicarboxylic acids such as phthalic acids, maleic acids, citraconic acids, itaconic acids and anhydrides thereof. Monomers constituting a vinyl polymer component are the ones having a carboxyl group or a hydroxy group, acrylic acid esters, and methacrylic acid esters.

In addition, when a polyester polymer or a vinyl polymer is used in combination with other binder resins, a binder resin having an acid value of the entire binder resin component of 0.1 mgKOH/g to 50 mgKOH/g at 60% by mass or more is preferable.

In the present invention, the acid value of the binder resin components of a toner composition is determined by the following method, and the basic measurement procedure is compliant with JIS K-0070.

(1) Additives other than binder resins (polymer component) in a sample are preliminarily removed, before the sample is used, or the acid value and the content of the components other than the binder resin component and cross-linked binder resin component are preliminarily determined. 0.5 to 2.0 g of the crushed product sample is precisely weighed. The weight of the polymer component is determined as W(g). For example, when the acid value of binder resins is measured from a toner, the acid value and the content of colorants, magnetic material, or the like are separately measured, and then the acid value of the binder resin is calculated.
(2) The sample is poured in a 300 ml beaker, 150 mL of a mixture of toluene/ethanol with a volume ratio of 4/1 is added to the sample and dissolved.
(3) Using 0.1 mol/L of KOH ethanol solution, the sample is titrated using an automatic potentiometric titrator.
(4) The usage of the KOH solution at that time is determined as S(mL). A blank sample is measured at the same time, and the usage of the KOH solution at that time is determined s B(mL). Then, the acid value of the binder resin component is calculated using the following Equation (1).

$$\text{Acid Value (mgKOH/g)} = ((S-B) \times f \times 5.61)/W \quad \text{Equation (1)}$$

The composition containing toner binder resin and a binder resin preferably has a glass transition temperature (Tg) of 35° C. to 80° C., and more preferably has a glass transition temperature (Tg) of 40° C. to 75° C. from the perspective of the storage stability of toner. When the glass transition temperature (Tg) is lower than 35° C., the toner is liable to be degraded in a high-temperature atmosphere, and offset events may easily occur at the time of fixing. When the glass transition temperature (Tg) is more than 80° C., the fixing property of toner may degrade.

Examples of magnetic materials which are usable in the present invention include (1) magnetic iron oxides such as magnetite, maghemite, and ferrite, and iron oxides containing other metal oxides; (2) metals such as iron, cobalt, and nickel, or alloys of these metals with metals such as aluminum, cobalt, copper, lead, magnesium, tin, zinc, antimony, beryllium, bismuth, cadmium, calcium, manganese, selenium, titanium, tungsten, and vanadium; and (3) mixtures thereof.

Specific examples of the magnetic materials include $Fe_3O_4$, $\gamma$-$Fe_2O_3$, $ZnFe_2O_4$, $Y_3Fe_5O_{12}$, $CdFe_2O_4$, $Gd_3Fe_5O_{12}$, $CuFe_2O_4$, $PdFe_{12}O$, $NiFe_2O_4$, $NdFe_2O$, $BaFe_{12}O_{19}$, $MgFe_2O_4$, $MnFe_2O_4$, $LaFeO_3$, iron powders, cobalt powders, and nickel powders. Each of these magnetic materials may be used alone or in combination with two or more. Of these, fine powders of ferrosoferric oxides, and $\gamma$-iron sesquioxides are suitably used.

In addition, magnetic iron oxides such as magnetite, maghemite, and ferrite each containing different elements, and mixtures thereof may be used. Examples of the different elements include lithium, beryllium, boron, magnesium, aluminum, silicon, phosphorus, germanium, zirconium, tin, sulfur, calcium, scandium, titanium, vanadium, chromium, manganese, cobalt, nickel, copper, zinc, and gallium. The preferred different elements are selected from magnesium, aluminum, silicon, phosphorus, and zirconium. Each of these different elements may be taken in crystal lattice of an iron oxide, or may be taken in an iron oxide as an oxide, or may exist as an oxide or a hydroxide on the surface of an iron oxide, and preferably, each of these different elements is contained as an oxide.

Salts of these different elements may be mixed in the each of these different elements in the course of producing the magnetic material and subjected to a pH adjustment to thereby be taken in particles of the iron oxide. In addition, after particles of the magnetic material are prepared, the each of these different elements may be precipitated on particle surfaces of the iron oxide by subjecting the each of these different elements to a pH adjustment or by adding salts of each of these elements and subjecting them to a pH adjustment.

The usage of the magnetic materials is preferably 10 parts by mass to 200 parts by mass and more preferably 20 parts by mass to 150 parts by mass relative to 100 parts by mass of the binder resin. The number average particle diameter of these magnetic materials is preferably 0.1 µm to 2 µm, and more preferably 0.1 µm to 0.5 µm. The number average particle diameter can be determined by measuring a photograph magnified by use of a transmission electron microscope using a deditizer.

With respect to magnetic properties of the magnetic materials, the ones having magnetic properties of an anti-magnetic force of 20 oersted to 150 oersted, a saturated magnetization of 50 emu/g to 200 emu/g, and a remanent magnetization of 2 emu/g to 20 emu/g under application of 10K oersted are preferably used.

The magnetic materials may be used as colorants.

Colorants to be used in the present invention are not particularly limited and may be suitably selected from those typically used for use. Examples of the colorants include carbon black, nigrosine dye, iron black, naphthol yellow S, Hansa yellow (10G, 5G, and G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), vulcan fast yellow (5G, R), tartrazinelake yellow, quinoline yellow lake, anthrasan yellow BGL, isoindolinon yellow, colcothar, red lead, lead vermilion, cadmium red, cadmium mercury red, antimony vermilion, permanent red 4R, parared, fiser red, parachloroorthonitro anilin red, lithol fast scarlet G, brilliant fast scarlet, brilliant carmine BS, permanent red (F2R, F4R, FRL, FRLL, F4RH), fast scarlet VD, vulcan fast rubin B, brilliant scarlet G, lithol rubin GX, permanent red F5R, brilliant carmin 6B, pigment scarlet 3B, bordeaux 5B, toluidine Maroon, permanent bordeaux F2K, Helio bordeaux BL, bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, victoria blue lake, metal-free phthalocyanin blue, phthalocyanin blue, fast sky blue, indanthrene blue (RS, BC), indigo, ultramarine, iron blue, anthraquinon blue, fast violet B, methylviolet lake, cobalt purple, manganese violet, dioxane violet, anthraquinon violet, chrome green, zinc green, chromium oxide, viridian green, emerald green, pigment green B, naphthol green B, green gold, acid green lake, malachite green lake, phthalocyanine green, anthraquinon green, titanium oxide, zinc flower, lithopone, and mixtures thereof.

The content of the colorants is preferably 1% by mass to 15% by mass, and more preferably 3% by mass to 10% by mass relative to the toner content.

The colorants used in the present invention may be used as a complex masterbatch compounded with a resin. Examples of the binder resin to be kneaded along with the masterbatch include, besides modified polyester resins and unmodified polyester resins, styrenes such as polystyrene, poly-p-chlorostyrene, polyvinyltoluene, and polymers of derivative substitution thereof; styrene copolymers such as styrene-p-chlorostyrene copolymers, styrene-propylene copolymers, styrene-vinyltoluene copolymers, styrene-vinylnaphthalene copolymers, styrene-methylacrylate copolyers, styrene-ethylacrylate copolymers, styrene-butylacrylate copolymers, styrene-octylacrylate copolymers, styrene-butylmethacrylate copolymers, styrene-ethylmethacrylate copolymers, styrene-butylmethacrylate copolymers, styrene-α-methylchlormethacrylate copolymers, styrene-acrylonitrile copolymers, styrene-methylvinylketone copolymers, styrene-butadiene copolymers, styrene-isopropene copolymers, styrene-acrylonitrile-indene copolymers, styrene-maleic acid copolymers, and styrene-ester maleate copolymers; polymethyl methacrylates, polybutylmethacrylates, polyvinyl chlorides, polyvinyl acetates, polyethylenes, polypropylenes, polyesters, epoxy resins, epoxy polyol resins, polyurethanes, polyamides, polyvinyl butyrals, polyacrylic resins, rosins, modified rosins, terpene resins, aliphatic hydrocarbon resins, alicyclic hydrocarbon resins, aromatic petroleum resins, chlorinated paraffins, and paraffin waxes. Each of these binder resins may be used alone or in combination with two or more.

The masterbatch may be obtained by applying a high shearing force to the resin for the masterbatch and the colorants and mixing or kneading the components. Here, to improve the interaction between the colorants and the resins, an organic solvent may be added thereto. Besides, a so-called flashing process is preferably employed. In the flashing process, a wet cake of colorants can be directly used without the necessity of drying. In the flashing process, a colorant-water-paste containing water is mixed and kneaded with resins and an organic solvent to transfer the colorants to the resins and then to remove the moisture and the organic solvent components. For the mixing and kneading, a high-shearing dispersion unit such as a triple roll mill is preferably used.

The usage of the masterbatch is preferably 0.1 parts by mass to 20 parts by mass relative to 100 parts by mass of the binder resin.

The resin used in the masterbatch preferably has an acid value of 30 mgKOH/g or less and an amine number of 10 to 100, and preferably the resin with a colorant or colorants dispersed therein is used. It is more preferably that the resin has an acid value of 20 mgKOH/g or less and an amine number of 10 to 50, and the resin with a colorant or colorants dispersed therein is used. When the acid value is more than 30 mgKOH/g, the charge property of toner may degrade in high-humidity conditions, and the dispersibility of pigments may be insufficient. In addition, when the amine number is less than 1 or more than 100, the dispersibility of pigments may be insufficient. It should be noted that the acid value can be measured in compliance with the method described in JIS K0070, and the amine number can be measured in compliance with the method described in JIS K7237.

In addition, the dispersing agent preferably has a high-compatibility with the binder resin in terms of the dispersibility of pigments. Specifically, examples of commercially available products of the dispersing agent include AJISPER PB821, and AJISPER PB822 (manufactured by Ajinomoto Fine-Techno Co., Inc.), Disperbyk-2001 (manufactured by BYK Chemie Japan), and EFKA-4010 (manufactured by EFKA Corp.).

The dispersing agent is preferably mixed in the toner at a composition ratio of 0.1% by mass to 10% by mass relative to the colorants used. When the composition ratio of the dispersing agent is less than 0.1% by mass, the dispersibility of pigments may be insufficient, and when the composition ratio is more than 10% by mass, the charge property of toner may degrade in high-humidity conditions.

The mass average molecular mass of the dispersing agent at the maximum molecular mass of the main peak based on a styrene-converted molecular mass determined by Gel Permeation Chromatography (GPC) is preferably 500 to 100,000, and more preferably 3,000 to 100,000. From the perspective of the dispersibility of pigments, it is particularly preferably 5,000 to 50,000, and most preferably 5,000 to 30,000. When the molecular mass is less than 500, the polarity is increased, which may cause degradation of the dispersibility of colorants. When the molecular mass is more than 100,000; the affinity with the solvent is increased, which may cause degradation of the dispersibility of colorants.

The added amount of the dispersing agent is 1 part by mass to 50 parts by mass and more preferably 5 parts by mass to 30 parts by mass relative to 100 parts by mass of the colorants. When the added amount is less than 1 part by mass, the dispersibility thereof may degrade, and when the added amount is more than 50 parts by mass, the charge property of toner may degrade.

—Other Components—

<Carrier>

The toner of the present invention may be mixed with a carrier to be used as a two-component developer. For the carrier, typically used carriers such as ferrite carrier and magnetite carriers, and resin-coated carriers may be used.

The resin-coated carrier contains carrier core particles, and a coating material being a resin for coating surfaces of the carrier core particles.

Preferred examples of the resin to be used for the coating material include styrene-acrylic resins such as styrene-acrylic acid ester copolymers, styrene-methacrylic acid ester copolymers; fluoride-containing resins such as polytetrafluoroetylenes, monochlorotrifluoroethylene polymers, and polybinylidene fluorides, silicone resins, polyester resins, polyamide resins, polyvinyl butyrals, and aminoacrylate resins. Besides, resins that can be used as a coating material of the carrier such as iomonomer resins, and polyphenilene sulfide resins can also be used. Each of these resins may be used alone or in combination with two or more.

Binder-type carrier core particles of which magnetic powders are dispersed in a resin can also be used.

As for a method for coating surfaces of the carrier core particles in the resin-coated carrier with at least a resin coating agent, a method of which a resin is dissolved or suspended in a solvent, and the resin coating solvent is made to adhere on surfaces of carrier core particles, and a method of which a resin is simply mixed in a powder condition are applicable.

The mixture ratio of the resin coating material relative to the resin coated material may be suitably determined, however, the mixture ratio is preferably 0.01% by mass to 5% by mass, and more preferably 0.1% by mass to 1% by mass.

Examples of use of a coating material containing a mixture of two or more elements to be used for coating a magnetic material include (1) those treated using 12 parts by mass of a mixture of dimethyldichlorosilan and dimethylsilicon oil at a mass ratio of 1:5 relative to 100 parts by mass of a titanium oxide fine powder; and those treated using 20 parts by mass of a mixture of dimethyldichlorosilan and dimethylsilicon oil at a mass ratio of 1:5 relative to 100 parts by mass of a silica fine powder.

For the resin, a syrene-mechylmethacrylate copolymer, a mixture of a fluoride-containing resin and a styrene copolymer, a silicone resin are suitably used, and particularly, a silicone resin is preferable.

Examples of the mixture of a fluoride-containing resin and a styrene copolymer include mixtures of polyvinylidenefluoride and a styrene-methylmethacrylate copolymer; mixtures of polytetrafluoroethylene and a styrene-methylmethacrylate copolymer; and mixtures of a fluorovinylidne-tetrafluoroethylene copolymer (copolymer mass ratio: 10:90 to 90:10), a styrene-acrylic acid 2-ethylhexyl copolymer (copolymer mass ratio: 10:90 to 90:10), and a styrene-acrylic acid 2-ethylhexyl-methylmechacrylate copolymer (copolymer mass ratio: 20-60:5-30:10:50).

Examples of the silicone resin include modified silicone resins each of which is produced by reacting nitrogen-containing silicone resins, and nitrogen-containing silane coupling agents with a silicone resin.

For magnetic materials of carrier core, it is possible to use, for example, ferrite, iron excess ferrite, magnetite, iron oxides such as γ-iron oxide, metals such as iron, cobalt, and nickel, and alloys thereof.

Examples of elements contained in these magnetic materials include iron, cobalt, nickel, aluminum, copper, lead, magnesium, tin, zinc, antimony, beryllium, bismuth, calcium, manganese, selenium, titanium, tungsten, and vanadium. Of these, copper-zinc-iron ferrite containing copper, zinc, and iron components as the main component, and manganese-magnesium-iron ferrite containing manganese, magnesium, and iron components as the main components are particularly preferable.

With respect to the resistance value of the carrier, it is preferable that the concave convex degree of the carrier surface and the amount of resin to be coated are controlled so as to have a resistance value of $10^6 \Omega \cdot cm$ to $10^{10} \Omega \cdot cm$.

With respect to the particle diameter of the carrier, those having a particle diameter of 4 μm to 200 μm can be used, however, the particle diameter is preferably 10 μm to 150 μm, and more preferably 20 μm to 100 μm. Particularly, a resin coated carrier preferably has a 50% particle diameter of 20 μm to 70 μm.

In a two-component developer, the toner of the present invention is preferably used in a content of 1 part by mass to 200 parts by mass relative to 100 parts by mass of the carrier.

<Wax>

In the present invention, a wax can also be contained in the toner composition along with the binder resin and the colorants.

The was used in the present invention is not particularly limited and may be suitably selected from those typically used, however, examples thereof include oxides of aliphatic hydrocarbon waxes such as low-molecular mass polyethylenes, low-molecualr mass polypropylenes, polyolefin waxes, microcrystalline waxes, paraffin wases, and Sasol Wax or block copolymers thereof; vegetable waxes such as candelilla waxers, caunauba waxes, sumac waxes, jojoba waxes; animal waxes such as bees waxes, lanolin waxes, whale wax; mineral waxes such as ozokerite, ceresin, and peterolatum; waxes containing an aliphatic ester as the main component such as montanic acid ester waxes and caster waxes, and waxes of which a part or the entire aliphatic ester such as deacidified caunauba waxes.

Further ecamples of the wax include saturated straight chain fatty acids such as palmitin acids, stearin acids, montanic acids, and straight chain alkylcarboxylic acids having a long-chain alkyl group; unsaturated fatty acids such as brassidic acids, eleostearic acids, and prinaric acids; saturated alcohols such as stearil alcohols, eicosyl alcohols, behenyl alcohols, carnaubic alcohols, ceryl alcohols, mesilyl alcohols or long-chain alkyl alcohols; polyvalent alcohols such as solbitol; fatty acid amides such as linoleic acid amides, olefin acid amides, and laulic acid amides; saturated fattcy acid bisamides such as methylenebiscapric acids, ethylenebis laulic acid amides, hexamethylenebisstearic acid amides; unsaturated fatty acid amides such as ethylenebis oleic acid amides, hexamethylenebis olecic acid amides, N,N'-dioleyl adipic acid aimdes, N,N'-dioleyl cebacic acid amides; aromatic bisamides such as m-xylene bisstearic acid amides, and N,N-distearyl isophthalic acid amides; fatty acid metal salts such as calcium stearates, calcium laurates, zinc stearates, and magnesium stearates; waxes in which a fatty acid hydrocarbon wax is grafted using a vinyl monomer such as styrene and acrylic acid; partially esterified compounds of a fatty acid such as behenic acid monoglyceride and a polyvalent alcohol; and methyl-esterified compounds having a hydroxyl group which are obtained by hydrogenating a vegitabl oil.

More preferable examples of the wax include polyolefins which are subjected to a radical polymerization under high pressures; polyolefins of which low-molecule mass by-product materials obtained when high-molecule mass polyolefin is polymerized; polyolefins polymerized under low pressures using a catalyst such as Ziegler catalyst, and metallocene catalyst; polyolefins polymerized by utilizing radiant ray, electromagnetic ray, or light; low-molecular mass polyolefins obtained by pyrolizing a high-molecular mass polyolefin; paraffin waxes, microcrystalline waxes, Fisher Tropsch wax; synthesized hydrocarbon waxes synthesized by Synthol process, Hidrocol process, Arge process, and the like; synthesized waxes each having a compound of 1 carbon atom as monomer; hydrocarbon waxes each having a functional group like hydroxyl group or carboxyl group; mixtures of a hydrocarbon wax and a hydrocarbon wax having a functional group; and graft-modified waxes that the base of each of the above-mentioned waxes is grafted by using a vinyl monomer such as styrenes, ester maleates, acrylates, methacrylates, and maleic acid anhydrides.

In addition, those having a sharp molecular mass distribution prepared by press exudation method, solvent method, re-crystallization method, supercritical gas extraction method or solution crystallization method; and those in which low-molecule mass solid fatty acids, low-molecule solid alcohol, low-molecule solid compounds, and other impurities are removed are also preferably used.

The melting point of the wax is preferably 70° C. to 140° C. for redressing the balance between fixing property and anti-offset property, and more preferably 70° C. to 120° C. When the melting point of the wax is less than 70° C., the anti-blocking property may degrade, and when the melting point is more than 140 anti-blocking property, anti-offset property may be hardly exerted.

By using a combination of two or more different waxes, both plasticization effect and releasing effect can be exerted at the same time.

Examples of waxes having plasticization effect include waxes each having a low-melting point, waxes each having a branched molecule structure, and waxes each having a polar group.

Examples of waxes having releasing effect include waxes each having a high-melting point, and examples of the molecular structure include straight chain molecules, and nonpolar molecules having no functional group. Examples of the combination include a combination of two or more different waxes that the difference in melting point is 10° C. to 100° C., and a combination of a polyolefin and graft-modified polyolefin.

When two different types of wax are selected, and the two waxes respectively have a similar structure, a wax having relatively low melting point exert plasticization effect, and the other wax i.e. a wax having high melting point exerts releasing effect. Here, when the difference in melting point is in the range of 10° C. to 100° C., the functional separation is effectively exerted. When the difference in melting point between the two waxes is less than 10° C., the functional separation may be hardly exerted. When the difference in melting point is more than 100° C., functional emphasis from mutual interaction may be hardly exerted. Here, the melting point of at least one of the waxes is preferably 70° C. to 120° C., and more preferably 70° C. to 100° C., because the functional separation effect tends to be easily exerted.

For the above mentioned waxes, those having a branched structure, those having a polar group like functional group, and those modified with a component which is different from the main component respectively exert plasticization effect, and those having a straight chain structure, nonpolar waxes which have no functional group, and unmodified straight waxes respectively exert releasing effect. Preferred combinations thereof include a combination of a polyethylene homopolymer having an ethylene as the main component or a polyolefin homopolymer having a copolymer and olefins other than ethylene as the main component, or a copolymer; a combination of a polyolefin and a graft-modified polyolefin; a combination of an alcohol wax, a fatty acid wax or an ester wax and a hydrocarbon wax; a combination of Fisher Tropsch wax or a polyolefin wax and a paraffin wax or a microcrystal wax; a combination of a paraffin wax and a microcrystal wax; and a combination of a carnauba wax, candelilla wax, a rice wax or a montan wax and a hydrocarbon wax.

In endothermic peak observed in toner DSC measurement, it is preferable that each of these waxes has a peak top temperature of the maximum endothermic peak within the range of 70° C. to 110° C., and more preferably, it has the maximum endothermic peak within the range of 70° C. to 110° C.

The total content of the wax is preferably 0.2 parts by mass to 20 parts by mass, and more preferably 0.5 parts by mass to 10 parts by mass relative to 100 parts by mass of the binder resin.

In the present invention, the peak top temperature of the maximum endothermic peak of a wax measured in DSC is to be a melting point of the wax.

As for the DSC measuring unit of the wax or the toner, a high-precision internal combustion input compensation type of differential scanning calorimeter is preferably used for the measurement. The endothermic peak measurement is performed in compliant with ASTM D3418-82. As for the DSC curve used in the present invention, the temperature of the wax or the toner is raised once and lowered, record the temperature history, and then the DSC curve measured when the temperature of the wax or the toner is raised at 10° C./m is used.

<Flowability Improving Agent>

A flowability improving agent may be added to the toner of the present invention. The flowability improving agent is used for making the toner easily flow by adding the flowability improving agent and making it adhere on the surface of the toner.

Examples of the flowability improving agent include carbon black; fluoride resin powders such as fluorinated vinylidene fine powders, and polytetrafluoroethylene fine powders; silica fine powders such as wet-process silicas, dry-process silicas; titanium oxide fine powders, alumina fine powders, and surface-treated silicas of which the silica fine powder, the titanium oxide fine powder or the alumina fine powder is subjected to a surface treatment using a silane coupling agent, a titanium coupling agent, or a silicone oil; surface-treated titanium oxide fine powders, and surface-treated aluminas. Of these, silica fine powders, titanium oxide fine powders, and alumina fine powders are preferably used. Treated silicas of which the silica fine powder, the nonoxidized titanium fine powder or the alumina fine powder is subjected to a surface treatment using a silane coupling agent or a silicone oil are more preferably used.

With respect to the particle diameter of the flowability improving agent, the primary average particle diameter is preferably 0.001 μm to 2 μm, and more preferably 0.002 μm to 0.2 μm.

The silica fine powers are fine powers produced by vapor-phase oxidation of a silicon-halogen compound and referred to as so-called dry-process silica or fumed silica.

Examples of commercially available silica fine powers produced by vapor-phase oxidation of a silicon-halogen compound include AEROSIL-130, AEROSIL-300, AEROSIL-380, AEROSIl-TT600, AEROSIL-MOX170, AEROSIL-MOX80, and AEROSIL-COK84 (manufactured by NIPPON AEROSIL CO., LTD.); Ca—O—SiL-M-5, Ca—O—SiL-MS-7, Ca—O—SiL-MS75, Ca—O—SiL-HS-5, and Ca—O—SiL-EH-5 (manufactured by CABOT Corp.); Wacker HDK-N20 V15, Wacker HDKV-N20E, Wacker HDK-T30, and Wacker HDK-T40 (manufactured by WACKER-CHEMIE GMBH); D-CFine Silica (manufactured by Dow Corning Co., Ltd.); and Fransol (manufactured by Fransil Sa).

Further, hydrophobized silica fine powers produced by hydrophobizing silica fine powder produced by vapor-phase oxidation of a silicon halogen compound are more preferably used. For the hydrophobized silica fine powders, since the hydrophobization degree of hydrophobized silica fine powers measured in methanol titration test is 30% to 80%, hydrophobized silica fine powders are particularly preferable. Hydrophobization is given by chemically or physically treating silica fine powder with an organic-silicon compound capable of reacting with or physically absorbing silica fine powder. As a preferred hydrophobization, it is preferable to employ a method in which a silica fine powder produce by vapor-phase oxidation of a silicon halogen compound is hydrophobized with an organic silicon compound.

Examples of the organic silicon compound include hydroxypropyltrimethoxysilane, phenyltrimethoxysilane, n-hexadecyltrimethoxysilane, n-octadecyltrimethoxysilane, vinylmethoxysilane, vinyltriethoxysilane, vinyltriacetoxysilane, dimethylvinylchlorosilane, divinylchlorosilane, γ-methacryloxypropyltrimethoxysilane, hexamethyldisilane, trimethylsilane, trimethylchlorosilane, dimethyldichlorosilane, methyltrichlorosilane, allyldimethylchlorosilane, allylphenyldichlorosilane, benzyldimethylchlorosilane, bromomethyldimethylchlorosilane, α-chlorethyltrichlorosilane, β-chloroethyltrichlorosilane, chloromethyldimethylchlorosilane, triorganosilylmercaptan, trimethylsilylmercaptan, triorganosilylacrylate, vinyldimethylacetoxysilane, dimethylethoxysilane, trimethylethoxysilane, trimethylmethoxysilane, methyltriethoxysilane, isobutyltrimethoxysilane, dimethyldimethoxysilane, diphenyldiethoxysilane, hexymethyldisiloxane, 1,3-divinyltetramethyldisiloxane, 1,3-diphenyltetramethyldisiloxane, and dimethylpolysiloxane having 2 to 12 siloxanes per molecule and containing 0 to 1 hydroxyl group which is bound to Si at each of the terminals of the siloxanes, and further include silicone oils such as dimethylsilicone oil. Each of these may be used alone or in combination with two or more.

The number average particle diameter of the flowability improving agent is preferably 5 nm to 100 nm, and more preferably 5 nm to 50 nm.

The specific surface area of the flowability improving agent based on nitrogen absorption measured by BET method is preferably 30 m$^2$/g or more, and more preferably 60 m$^2$/g to 400 m$^2$/g.

The specific surface area of a surface-treated fine powder based on nitrogen absorption measured by BET method is preferably 20 m$^2$/g or more, and more preferably 40 m$^2$/g to 300 m$^2$/g.

The usage of these fine powders is preferably 0.03 parts by mass to 8 parts by mass relative to 100 parts by mass of toner particles.

To the toner of the present invention, other additives can be suitably added in accordance with the necessity, aiming at protecting latent electrostatic image bearing member and carrier, improving cleaning ability, controlling thermal property, electric property, and physical property, controlling resistance property, controlling softening point, and improving fixing rate. Examples of the other additives include various metal soaps, fluoride surfactants, dioctyl phthalate; conductivity imparting agents such as tin oxides, zinc oxides, carbon black, and antimony oxides; and inorganic fine powders such as titanium oxides, aluminum oxides, and aluminas. Each of these inorganic fine powders may be hydrophobized in accordance with the necessity. In addition, it is possible to use a small amount of lubricant such as polytetrafluoroethylene, zinc stearate, and polyfluorovinylidene; and abrasive such as cesium oxides, silicon carbides, and strontium titanate; and caking protecting agents. Besides, white fine particles and black fine particles having a reverse polarity from the polarity of toner particles can be further added as developing property improving agent.

It is also preferable that each of these additives is treated with treatment agents such as silicone varnish, various types of modified-silicone varnish, silicone oil, various types of silicone oil, silane coupling agent, silane coupling agent having a functional group, and other organic silicon compounds or other types of treatment agents, aiming at controlling the charge amount of the toner.

In the course of preparation of a developer, inorganic fine particles such as the above-noted hydrophobized silica fine powders may be mixed and added in order to enhance flowability, storage stability, developing property, and transferability of the developer.

As for the mixing of external additives, a generally used mixer for powder is used in mixing external additives, however, a mixer equipped with a jacket or the like and capable of controlling the inside temperature thereof is preferable. To change history of load to be applied to the external additives, the external additives may be added in the course of mixing or by degrees. Of course, rotation speed of a mixer, rolling speed, mixing time, temperature, or the like may be altered. A heavy load may be given first, and then a relatively light load may be given to the mixer or may be conversely.

Examples of usable mixing equipment include V-shaped mixer, rocking mixer, Ledige mixer, Nauter mixer, and HENSCHEL MIXER. HENSCHEL MIXER.

The method for controlling the shape of the obtained toner is not particularly limited, may be suitably selected in accordance with the intended use, and examples of the method include a method in which a toner composition containing a binder resin and a colorant or the like are fused, kneaded, and finely pulverized, and the pulverized toner is mechanically controlled and shaped using hybritizer and MECHANOFUSION; so-call spray dry method in which the toner composition is dissolved or dispersed in a toner-binder soluble solvent, and the solution or the dispersion is subjected to a solvent removal treatment using a spray drying device to thereby obtain a spherical toner; and a method of which a toner is made to be formed in spherical shape by heating the toner composition in an aqueous medium.

For the external additives, inorganic fine particles are preferably used.

Examples of the inorganic fine particles include silicas, aluminas, titanium oxides, barium titanates, magnesium titanates, calcium titanates, strontium titanates, zinc oxides, tin oxides, silica sand, clay, mica, wallastonite, silious earth, chromium oxides, ceric oxides, colcothar, antimony trioxides, magnesium oxides, zirconium oxides, barium sulfates, barium carbonates, calcium carbonates, silicon carbides, and silicon nitrides.

The primary particle diameter of the inorganic fine particles is preferably 5 mµ to 2 µm, and more preferable 5 mµ to 500 µm.

The specific surface are of the inorganic fine particles based on the BET method is preferably 20 m$^2$/g to 500$^2$/g.

The usage ratio of the inorganic fine particles relative to the toner is preferably 0.01% by mass to 5% by mass, and more preferably 0.01% by mass to 2.0% by mass.

Besides, for the external additives, there are high-molecule fine particles such as polystyrenes obtained by soap-free emulsification polymerization, suspension polymerization, and dispersion polymerization; copolymers of methacrylic acid ester and acrylic acid ester; and polycondensed fine particles such as silicone, benzoguanamine, and nylon; and polymer particles using a thermosetting resin.

Deterioration of these external additives can be prevented even under high humidity conditions by improving the hydrophobicity thereof using a surface treatment agent.

Preferred examples of the surface treatment agent include silane coupling agents, sililation reagents, silane coupling agents having a fluorinated alkyl group, organic titanate coupling agents, aluminum coupling agents, silicone oils, and modified silicone oils.

Besides, examples of cleaning ability improving agents for removing developer remaining on a latent electrostatic image bearing member or a primary transferring medium after transferring include fatty acid metal slats such as zinc stearate, calcium stearate, and stearic acid; and polymer fine particles, for example, produced by a soap-free emulsion polymerization method such as polymethyl methacrylate fine particles, and polystyrene fine particles. Polymer fine particles preferably have a relatively narrow particle size distribution and a weight average particle diameter of 0.01 μm to 1 μm.

In the developing method used in the present invention, a latent electrostatic image bearing member used in conventional electrophotography can be used. For example, organic latent electrostatic image bearing members, amorphous silica latent electrostatic image bearing members, selenium latent electrostatic image bearing members, zinc oxide latent electrostatic image bearing members can be suitably used.

According to the present invention, it is possible to provide a method for producing a toner capable of effectively producing a toner to be used as a developer for developing latent electrostatic images in electrophotography, electrostatic recording, electrostatic printing and the like, by which the toner has no variation range of particles in various property values required for a toner such as flowability and charge property particles or has less variations in the property values, although such a variation range of particles have been observed in the conventional toner production methods, by making toner particles have an unprecedented level of monodispersity of particle size, and it is also possible to provide a toner produced by the method for producing a toner and a toner production apparatus using the method for producing a toner.

EXAMPLES

Hereinafter, the present invention will be further described in detail referring to Examples and Comparative Examples, however, the present invention is not limited to the disclosed examples. In addition, in the description hereinafter, standard evaluation methods and criteria for phase-change rewritable two-layered DVD medium are employed, however, media used in the present invention are not necessarily limited to optical recording media based on a specific format.

Example 1

—Preparation of Colorant Dispersion—

First, a dispersion of carbon black was prepared as a colorant dispersion.

To 82 parts by mass of ethyl acetate, 15 parts by mass of carbon black (Regal 400, manufactured by CABOT Corp.), 3 parts by mass of a pigment dispersing agent was added and primarily dispersed using a mixer having a stirring blade. For the pigment dispersing agent, AJISPER PB821 (manufactured by Ajinomoto Fine-Techno Co., Inc.) was used. The obtained primary dispersion was subjected to a strong shearing force using DYNO MILL to finely disperse the dispersion to thereby prepare a secondary dispersion that the aggregate had been completed removed. Further, the secondary dispersion was passed through a filter having fine pores of 045 μm (manufactured by PTFE) to prepare a dispersion dispersed to submicrons.

—Preparation of Resin and Wax-added Dispersion—

Next, a dispersion containing the following composition and to which a resin as a binder resin, and a wax were added was prepared.

To 1,000 parts by mass of ethyl acetate, 100 parts by mass of polyester resin as a binder resin, 30 parts by mass of the carbon black dispersion, and 5 parts by mass of carnauba wax were added, and stirred for 10 minutes using the same mixer having a stirring blade as in the preparation of the pigment dispersion so as to be dispersed. Even when a shock of dilution of the solvent was induced, it was possible to completely prevent the pigment or the like from aggregating. The dispersion at this stage was filtrated using a filter having fine pores of 045 μm (manufactured by PTFE) as in the preparation of the pigment dispersion. It was confirmed that all the dispersion passed through the filter without causing clogging. The electrolytic conductivity of the dispersion was $3.5 \times 10^{-7}$ S/m.

—Preparation of Toner—

The thus obtained dispersion was supplied to the nozzle 1 of the toner production apparatus as shown in FIGS. 1 and 2. The nozzle was prepared as follows. On a nickel plate having a thickness of 20 μm, an ejection hole in a round shape having a diameter of 10 μm were formed using a femtosecond laser.

After preparing the dispersion, droplets of the dispersion were ejected, and the ejection droplets were dried and solidified to thereby prepare a toner under the following conditions:

[Toner Preparation Conditions]

Specific gravity of dispersion: $\rho = 1.888$ g/cm$^3$

Flow rate of dry air: Orifice sheath 2.0 L/m, inside air flow rate of the apparatus 3.0 L/m Dry air temperature: 80° C. to 82° C.

Inside temperature of the apparatus: 27° C. to 28° C.

Dew-point temperature: −20° C.

Voltage applied to electrodes: 2.5 KV

Vibration frequency applied to nozzle: 220 kHz

Figure 3:
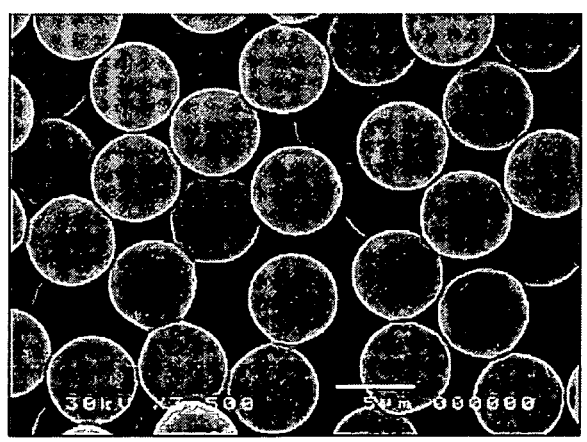
FIG. 3 is a scanning electron micrograph of toner-base particles prepared in Example 1.

The dried and solidified toner particles were absorbed to and trapped through a filter having fine pores of 1 μm. The particle size distribution of the trapped toner particles was measured using a flow particle image analyzer (FPIA-2000). The weight average particle diameter of the toner particles was 6.0 μm, the number average particle diameter was also 6.0 μm, and it was possible to obtain completely monodisperse toner base particles. A scanning electron micrograph of the toner base particles was shown in FIG. 3.

—Evaluation of Toner—

Each of the obtained toners was evaluated as follows. Table 1 shows the evaluation results.

<Particle Size Distribution>

The weight average particle diameter (D4) and the number average particle diameter (Dn) of the toners produced in the present invention were measured using Coulter Multisizer III (manufactured by Beckman Coulter, Inc.) with an aperture diameter 100 μm, and the measurement results were analyzed using analyzer software (Beckman Coulter Multisizer 3 Version 3.51).

Specifically, to a 100 mL glass beaker, 0.5 mL of a 10% by mass surfactant (alkylbenzene sulfonate Neogen SC-A, manufactured by Daiichi Kogyo Seiyaku Co., Ltd.) was added, then 0.5 g of each of the obtained toners was added thereto and stirred with Microspartel, and then 80 mL of ion exchange water was poured to the beaker. The thus obtained dispersion was dispersed in an ultrasonic dispersing apparatus (W-113MK-II, manufactured by HONDA ELECTRONICS CO., LTD.) for 10 minutes. Using Isoton III as a solution for measurement, properties of the dispersion were measured using the Multisizer III. The measurement was performed by titrating the toner sample dispersion such that the concentration thereof indicated by the apparatus i.e. Multisizer III was 8%±2%. In the measurement, controlling the concentration of the toner sample dispersion to 8%±2% is important from the viewpoint of measurement reproductivity of particle diameter. Within the concentration range, no misalignment error with respect to particle diameter occurs. In the measurement, the following 13 channels were used, and particles having a particle diameter of 2.00 μm or more to less than 40.30 μm (2.00 μm<40.30 μm) were intended for the use in the measurement. A channel having a diameter of 2.00 μm<2.52 μm; a channel having a diameter of 2.52 μm<3.17 μm; a channel having a diameter of 3.17 μm<4.00 μm; a channel having a diameter of 4.00 μm<5.04 μm; a channel having a diameter of 5.04 μm<6.35 μm; a channel having a diameter of 6.35 μmμm<8.00 μm; a channel having a diameter of 8.00 μm<10.08 μm; a channel having a diameter of 10.08 μm<12.70 μm; a channel having a diameter of 12.70 μm<16.00 μm; a channel having a diameter of 16.00 μm<20.20 μm; a channel having a diameter of 20.20 μm<25.40 μm; a channel having a diameter of 25.40 μm<32.00 μm; and a channel having a diameter of 32.00 μm<40.30 μm.

The volume of the respective toners and the number of toner particles were measured, and then the volume distribution and the number distribution were calculated. From the calculated distribution results, the weight average particle diameter (D4) and the number average particle diameter (Dn) of each of the toners can be determined. As an index of particle size distribution, D4/Dn (the weight average particle diameter (D4) is divided by the number average particle diameter (Dn)) was used. When the toner is completely monodisperse, the value of D4/Dn is 1. It means that the greater the value D4/Dn is the wider the particle size distribution.

<Charge Amount>

The charge amount of each of the toners was measured using an absorption type of charge amount measuring apparatus. Specifically, each of the toners was absorbed in a Faraday cage equipped with a filter capable of trapping toner in a range of 200 mg to 250 mg, and an electrometer was connected to the Faraday cage to measure the toner charge amount of the each of absorbed toners. Here, the increased mass from the preliminarily measured mass of the filter was determined as the mass of the toner placed on the filter, and the toner was weighed using a chemical balance having 5-digit precision scale, and the total charge amount of toner was divided by the mass of the toner to determine the charge amount per mass (q/m). As a commercially available charge amount measuring apparatus based on a similar measurement principle to the above noted charge amount measuring apparatus, there is Model 210HS-2A manufactured by TREK JAPAN Co., Ltd., however, a charge amount measuring apparatus having the similar structure as above manufactured by Ricoh Company Ltd. was used in the present invention. As a filter for trapping toner, a glass microfiber having a diameter of 21 mm (Whatman) was used. There was little measurement difference depending on the toner absorption time, and the toner absorption time in the present invention was specified as within 30 seconds.

<Charge Amount at Room-Temperature and High-Humidity>

The charge amount of the respective toners was measured in a laboratory under environmental conditions of a temperature of 30° C. and a humidity of 90% according to the charge amount measurement method. The respective toner samples were left under the conditions for 12 hours, and then the charge amount of the respective toner sample was measured.

<Charge Amount Distribution>

The charge amount distribution of the respective toner samples was measured using a charge amount distribution measuring apparatus (E-Spart Analyzer EST-2, manufactured by Hosokawa micron Corp.). Specifically, each of the toner samples was directly introduced to the toner inlet of the measuring apparatus using a toner feeder so as to measure 500 toner particles per minute to 600 toner particles per minute, and then the charge amount distribution of the each of the toner samples was measured. The index indicating the distribution of the charge amount of toner was represented by the width of the distribution at the one-half height value (half-value width) of the mode (peak value) [q/d] or the most frequency. As for properties of toner, it is preferable that it has a high-charge amount and a more sharp charge amount distribution. Generally, there is a tendency that the higher the charge amount, the greater the half-value width indicating the charge amount. When the peak value is 0.25 fC/μm or more and the half-value width of the charge amount distribution is 0.2 or less, it is judged that the toner is excellent in the charge amount distribution.

<Thin-line Reproductivity>

The developer was supplied to a remodeled machine of which the developing unit part of a commercially available copier (imagio Neo 271, manufactured by Ricoh Company, Ltd.) had been remodeled. Using paper sheets (manufactured by Ricoh Company Ltd.), printing was performed with an image having an image rate of 7%. The $10^{th}$ image sheet of paper obtained at the early stage of the printing and the $30,000^{th}$ image sheet of paper were respectively magnified 100 times using an optical microscope, and the two image sheets of paper were observed for comparison with respect to the thin-line parts thereof, and the unprinted line condition of the two image sheets of paper was evaluated with four levels, comparing the printing results with a gradual print specimen. The image quality is high in the order of A>B>C>D. Particularly, the evaluation level D is a level where it cannot be employed as a product. Here, when a toner having a negative electric was used, an organic latent electrostatic image bearing member was used, and when a toner having a positive electric was used, an amorphous silicon latent electrostatic image bearing member was used.

In developing method 1, the toner was directly conveyed to the developing site using an airflow, and the image was developed using power cloud. In developing method 2, a resin coat carrier used in conventional electrophotography as a conveying unit was used. The following carrier was used.

(Carrier)

Core material: Spherical ferrite particles having an average particle diameter of 50 μm Material constituting coat material: Silicone resin The silicone resin was dispersed in toluene to prepare a dispersion, and then the dispersion was spray-coated with the core material under warming condition. Then the dispersion was calcined, and cooled to thereby prepare carrier particles having an average resin-coated thickness of 0.2 μm.

Example 2

An intended toner was obtained in the same manner as in Example 1 except that the diameter of the ejection hole was changed to 5 μm, and the concentration of solid parts of the toner was increased to 8 times the concentration of solid parts in Example 1. Consequently, the toner had a weight average particle diameter of 6.0 μm and a number average particle diameter of 6.0 μm, and it was also possible to obtain completely monodisperse toner base particles.

The obtained toner was evaluated with respect to the properties. Table 1 shows the evaluation results.

Example 3

An intended toner was obtained in the same manner as in Example 1 except that the diameter of the ejection hole was changed to 20 μm, and the concentration of solid parts of the toner was reduced to 0.125 times the concentration of solid parts in Example 1. Consequently, the toner had a weight average particle diameter of 6.0 μm and a number average particle diameter of 6.0 μm, and it was also possible to obtain completely monodisperse toner base particles.

The obtained toner was evaluated with respect to the properties. Table 1 shows the evaluation results.

Example 4

An intended toner was obtained in the same manner as in Example 1 except that the nozzle frequency was changed to 440 kHz, and the flow rate of the toner dispersion supplied from the syringe pump was increased to 2 times the flow rate in Example 1. Consequently, the toner had a weight average particle diameter of 6.0 μm and a number average particle diameter of 6.0 μm, and it was also possible to obtain completely monodisperse toner base particles.

The obtained toner was evaluated with respect to the properties. Table 1 shows the evaluation results.

Example 5

An intended toner was obtained in the same manner as in Example 1 except that the nozzle frequency was changed to 110 kHz, and the flow rate of the toner dispersion supplied from the syringe pump was reduced to 0.5 times the flow rate in Example 1. Consequently, the toner had a weight average particle diameter of 6.0 μm and a number average particle diameter of 6.0 μm, and it was also possible to obtain completely monodisperse toner base particles.

The obtained toner was evaluated with respect to the properties. Table 1 shows the evaluation results.

Example 6

Figure 4:
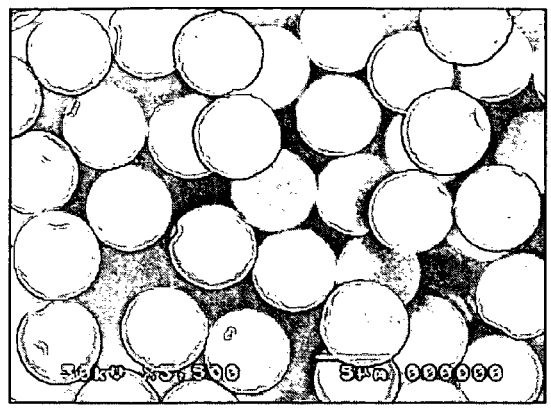
FIG. 4 is a scanning electron micrograph of toner-base particles prepared in Example 6.

An intended toner was obtained in the same manner as in Example 1 except that a styrene acrylic acid copolymer resin having a specific gravity of 1.05 was used instead of polyester resin. The toner had a weight average particle diameter of 6.0 μm and a number average particle diameter of 6.0 μm, and it was also possible to obtain completely monodisperse toner base particles, however, a plurality of dimples or concaves were observed on the surfaces of toner particles, and this point was different from the result of Example 1. FIG. 4 is a scanning electron micrograph of the toner base particles.

Then, the obtained toner was evaluated with respect to the properties. Table 1 shows the evaluation results.

Example 7

An intended toner was obtained in the same manner as in Example 1 except that instead of the nozzle used in Example 1, 10 nozzles each having a round-shaped diameter of 10 μm were provided on a nickel plate having a thickness of 20 μm using a femtosecond laser, and 200 ejection holes were formed such that 20 ejection holes were formed for each nozzle concentrically within the range of a central diameter of 1.5 mm on the plate. Consequently, the toner had a weight average particle diameter of 6.0 μm and a number average particle diameter of 6.0 μm, and it was also possible to obtain completely monodisperse toner base particles.

The obtained toner was evaluated with respect to the properties. Table 1 shows the evaluation results.

Example 8

Figure 5:
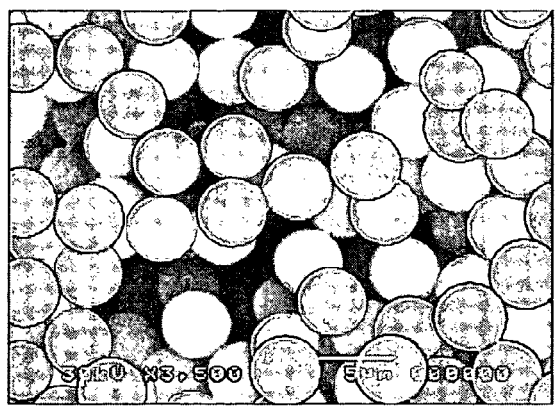
FIG. 5 is a scanning electron micrograph of toner-base particles prepared in Example 8.

An intended toner was obtained in the same manner as in Example 1 except that the amount of ethyl acetate used for the dispersion to which the resin and wax had been added was changed to 5,350 parts by mass. The toner had a weight average particle diameter of 5.0 μm and a number average particle diameter of 5.0 μm, and it was also possible to obtain completely monodisperse toner base particles. FIG. 5 is a scanning electron micrograph of the toner base particles.

Then, the obtained toner was evaluated with respect to the properties. Table 1 shows the evaluation results.

Example 9

Figure 6:
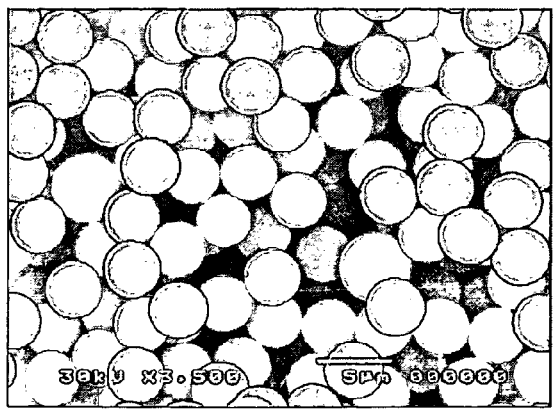
FIG. 6 is a scanning electron micrograph of toner-base particles prepared in Example 9.

An intended toner was obtained in the same manner as in Example 1 except that the amount of ethyl acetate used for the dispersion to which the resin and wax had been added was changed to 10,449 parts by mass. The toner had a weight average particle diameter of 4.0 μm and a number average particle diameter of 4.0 μm, and it was also possible to obtain completely monodisperse toner base particles. FIG. 6 is a scanning electron micrograph of the toner base particles.

Then, the obtained toner was evaluated with respect to the properties. Table 1 shows the evaluation results.

Example 10

Figure 7:
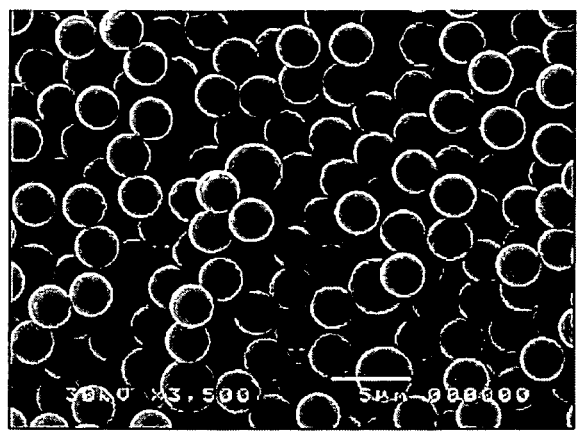
FIG. 7 is a scanning electron micrograph of toner-base particles prepared in Example 10.

An intended toner was obtained in the same manner as in Example 1 except that the amount of ethyl acetate used for the dispersion to which the resin and wax had been added was changed to 24,767 parts by mass. The toner had a weight average particle diameter of 3.0 μm and a number average particle diameter of 3.0 μm, and it was also possible to obtain completely monodisperse toner base particles. FIG. 7 is a scanning electron micrograph of the toner base particles.

Then, the obtained toner was evaluated with respect to the properties. Table 1 shows the evaluation results.

Comparative Example 1

—Preparation of Dispersion—

A colorant dispersion and a dispersion to which the resin and the wax had been added were respectively prepared in the same conditions as in Example 1.

—Preparation of Toner—

The toner production apparatus used in Example 1 was changed to a toner production apparatus which was equipped with a dispersion retention part for retaining a dispersion therein, and a head part capable of ejecting droplets from a nozzle by applying to the retention part a piezoelectric pulse generated by expansion and contraction from a piezoelectric device. After preparing the dispersion, droplets of the dispersion were ejected under the following toner preparation conditions, and the ejection droplets were dried and solidified to thereby prepare a toner. The great difference between the toner production apparatus in Example 1 and the toner production apparatus in Comparative Example 1 is that the toner production apparatus used in Example 1 has a structure in which vibration is directly applied to the nozzle, and the toner production apparatus used in Comparative Example 1 has a structure in which the piezoelectric pulse was applied to the dispersion retention part.

Figure 8:
FIG. 8 is a scanning electron micrograph of toner-base particles prepared in Comparative Example 1.

[Toner Preparation Conditions]
  Specific gravity of dispersion: ρ=1.888 g/cm$^3$
  Flow rate of dry air: Inside air flow rate of the apparatus=3.0 L/m
  Dry air temperature: 80° C. to 82° C.
  Inside temperature of the apparatus: 27° C. to 28° C.
  Dew-point temperature of dry air: −20° C.
  Frequency of piezoelectric pulse: 20 kHz The dried and solidified toner particles were absorbed to and trapped through a filter having fine pores of 1 µm. The particle size distribution of the trapped toner particles was measured using a flow particle image analyzer (FPIA-2000). The weight average particle diameter of the toner particles was 7.8 µm, the number average particle diameter was 5.2 µm, and toner base particles having a wide particle size distribution were obtained. A scanning electron micrograph of the toner base particles was shown in FIG. 8.

Then, the obtained toner was evaluated with respect to the properties. Table 1 shows the evaluation results.

Comparative Example 2

—Preparation of Dispersion—
A colorant dispersion and a dispersion to which the resin and the wax had been added were prepared in the same conditions as in Example 1.

—Preparation of Toner—
The toner production apparatus used in Example 1 was changed to a toner production apparatus which was equipped with a dispersion retention part for retaining a dispersion therein, and a head part capable of ejecting droplets from a nozzle by applying to the retention part a pressurized pulse obtained by further gathering a piezoelectric pulse generated by expansion and contraction from a piezoelectric device by use of an acoustic lens. Then, a toner was prepared under the same conditions as in Comparative Example 1. The great difference between the toner production apparatus in Example 1 and the toner production apparatus in Comparative Example 2 is that the toner production apparatus used in Example 1 has a structure in which vibration is directly applied to the nozzle, and the toner production apparatus used in Comparative Example 2 has a structure in which the piezoelectric pulse was applied to the dispersion retention part.

Figure 9:
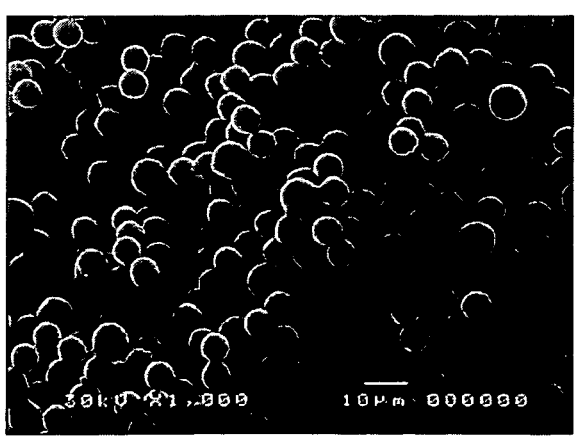
FIG. 9 is a scanning electron micrograph of toner-base particles prepared in Comparative Example 2.

The dried and solidified toner particles were absorbed to and trapped through a filter having fine pores of 1 µm. The particle size distribution of the trapped toner particles was measured using a flow particle image analyzer (FPIA-2000). The weight average particle diameter of the toner particles was 7.2 µm, the number average particle diameter was 5.6 µm, and toner base particles having a wide particle size distribution were obtained. A scanning electron micrograph of the toner base particles was shown in FIG. 9.

Then, the obtained toner was evaluated with respect to the properties. Table 1 shows the evaluation results.

Comparative Example 3

—Preparation of Dispersion—
A colorant dispersion and a dispersion to which the resin and the wax had been added were prepared in the same conditions as in Example 1.

—Preparation of Toner—
Instead of the toner production apparatus equipped with the droplet ejection part used in Example 1, a toner production apparatus was used which was equipped with a dispersion retention part for retaining a dispersion therein, and a head part capable of ejecting droplets from a nozzle. The head part was configured to give a heat energy to a dispersion retained in the dispersion retention part through a heating element generating heat by application of an alternating-current voltage, and to induce volume expansion of air bubbles generated at that time in the dispersion retention part so as to enable droplets to be ejected from the nozzle. Then, a toner was prepared under the same conditions as in Comparative Example 1.

Figure 10:
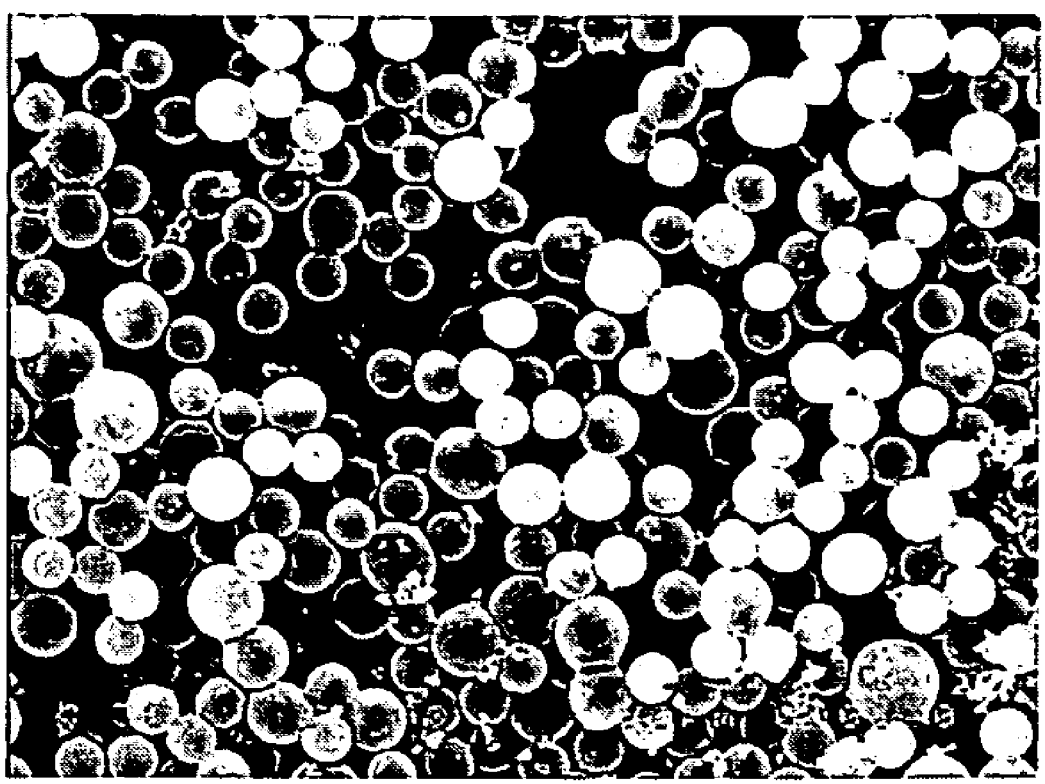
FIG. 10 is a scanning electron micrograph of toner-base particles prepared in Comparative Example 3.

The dried and solidified toner particles were absorbed to and trapped through a filter having fine pores of 1 µm. The particle size distribution of the trapped toner particles was measured using a flow particle image analyzer (FPIA-2000). The weight average particle diameter of the toner particles was 7.9 µm, the number average particle diameter was 4.6 µm, and toner base particles having a wide particle size distribution and lots of microscopic particles of 1 µm or less were obtained. A scanning electron micrograph of the toner base particles was shown in FIG. 10.

Then, the obtained toner was evaluated with respect to the properties. Table 1 shows the evaluation results.

TABLE 1

| | Average particle diameter D50 (µm) | Particle size distribution D4/Dn | Charge amount (µC/g) | NH Charge amount (µC/g) | Charge amount distribution (fC/µm) Peak value | Charge amount distribution (fC/µm) Half value width | Thin-line Reproductivity Developing method 1 | Thin-line Reproductivity Developing method 2 |
|---|---|---|---|---|---|---|---|---|
| Ex. 1 | 6.01 | 1.00 | −35.0 | −34.8 | −0.44 | 0.14 | A | A |
| Ex. 2 | 6.03 | 1.01 | −35.5 | −35.1 | −0.44 | 0.15 | A | A |
| Ex. 3 | 6.03 | 1.01 | −34.5 | −33.6 | −0.43 | 0.15 | A | A |
| Ex. 4 | 6.02 | 1.00 | −34.5 | −34.8 | −0.45 | 0.14 | A | A |
| Ex. 5 | 6.03 | 1.01 | −35.2 | −34.4 | −0.44 | 0.15 | A | A |
| Ex. 6 | 6.02 | 1.00 | −35.4 | −33.7 | −0.43 | 0.13 | A | A |
| Ex. 7 | 6.03 | 1.01 | −35.7 | −34.7 | −0.47 | 0.14 | A | A |
| Ex. 8 | 5.04 | 1.02 | −48.2 | −47.5 | −0.43 | 0.16 | A | A |
| Ex. 9 | 4.03 | 1.01 | −61.5 | −60.2 | −0.41 | 0.18 | A | A |
| Ex. 10 | 3.02 | 1.00 | 80.7 | −80.1 | −0.42 | 0.20 | B | B |

TABLE 1-continued

| | Average particle diameter D50 (μm) | Particle size distribution D4/Dn | NH Charge amount (μC/g) | Charge amount (μC/g) | Charge amount distribution (fC/μm) Peak value | Half value width | Thin-line Reproductivity Developing method 1 | Developing method 2 |
|---|---|---|---|---|---|---|---|---|
| Compara. Ex. 1 | 7.84 | 1.51 | −25.4 | −24.3 | −0.18 | 0.25 | C | D |
| Compara. Ex. 2 | 7.20 | 1.28 | −27.4 | −26.4 | −0.24 | 0.32 | B | C |
| Compara. Ex. 3 | 7.94 | 1.73 | −32.5 | −31.7 | −0.15 | 0.27 | D | D |

The results shown in Table 1 exemplified that a toner can be effectively produced by the method for producing a toner of the present invention, and the toner properties are extremely excellent. Further, the images obtained by developing and forming the images using the toner of the present invention were extremely true to the latent electrostatic images used and were excellent in image quality.

What is claimed is:

1. A method for producing a toner comprising:
ejecting a toner composition fluid from a nozzle,
vibrating the nozzle at a constant frequency to induce constrictions of a liquid column in the toner composition fluid ejected from the nozzle and to split the liquid column at a front edge to make the toner composition fluid into droplets, and
solidifying the droplets to be made into particles,
wherein
the toner composition fluid comprises a toner composition, and the toner composition comprises a resin and a colorant and
the nozzle is vibrated by a vibration generating unit, which makes contact with the nozzle to thereby directly vibrate the nozzle.

2. A method for producing a toner comprising:
ejecting a solution or a dispersion of a toner composition from a nozzle,
vibrating the nozzle at a constant frequency to induce constrictions of a liquid column in the toner composition fluid ejected from the nozzle and to split the liquid column at a front edge to make the solution or the dispersion into droplets, and
drying the droplets,
wherein the solution or the dispersion of the toner composition comprises a resin and a colorant and
the nozzle is vibrated by a vibration generating unit, which makes contact with the nozzle to thereby directly vibrate the nozzle.

3. The method for producing a toner according to claim 1, wherein the vibration generating unit is a piezoelectric device, and the nozzle is vibrated at a constant frequency in accordance with expansion and contraction of the piezoelectric device.

4. The method for producing a toner according to claim 2, wherein the nozzle comprises an ejection hole formed with a metal plate having a thickness of 5 μm to 50 μm, and the ejection hole has an aperture diameter of 3 μm to 35 μm.

5. The method for producing a toner according to claim 2, wherein any one of a positive charge and a negative charge is applied to the droplets ejected from the nozzle by means of electrostatic induction.

6. The method for producing a toner according to claim 5, wherein the electrostatic induction is performed by passing the droplets ejected from the nozzle through between a pair of electrodes with a direct-current voltage applied thereto.

7. The method for producing a toner according to claim 2, wherein the solution or the dispersion of the toner composition which comprises the resin and the colorant has an electrolytic conductivity of $1.0 \times 10^{-7}$ S/m or more.

8. The method for producing a toner according to claim 2, wherein a solvent used for the solution or the dispersion of the toner composition which comprises the resin and the colorant has an electrolytic conductivity of $1.0 \times 10^{-7}$ S/m or more.

9. The method for producing a toner according to claim 2, wherein a dry gas is flowed in the same direction as the ejected droplets to thereby generate an airflow, and the airflow conveys the droplets within a solvent removal system to remove the solvent in the droplets in the course of the conveyance to thereby form toner particles.

10. The method for producing a toner according to claim 9, wherein the dry gas is any one of air and a nitrogen gas.

11. The method for producing a toner according to claim 9, wherein the temperature of the dry gas is 40° C. to 200° C.

12. The method for producing a toner according to claim 2, wherein the solvent removal system comprises a carrier path surrounded by an electrostatic curtain which is charged with a reverse polarity from the charge polarity of the droplets, and the droplets are passed through the carrier path.

13. The method for producing a toner according to claim 1, wherein the toner composition fluid is pumped to the nozzle.

14. The method for producing a toner according to claim 2, wherein the solution or the dispersion of the toner composition is pumped to the nozzle.

15. The method for producing a toner according to claim 1, wherein the toner composition fluid is ejected from a plurality of nozzles formed with one metal plate which is vibrated by the vibration generating unit.

16. The method for producing a toner according to claim 2, wherein the solution or the dispersion of the toner composition is ejected from a plurality of nozzles formed with one metal plate which is vibrated by the vibration generating unit.

* * * * *